US011622234B2

(12) United States Patent
Catalena

(10) Patent No.: US 11,622,234 B2
(45) Date of Patent: Apr. 4, 2023

(54) PASSIVE ASSET TRACKING USING OBSERVATIONS OF WI-FI ACCESS POINTS

(71) Applicant: Troverlo, LLC, College Station, TX (US)

(72) Inventor: Cody William Catalena, College Station, TX (US)

(73) Assignee: TROVERLO, INC., College Station, TX (US)

(*) Notice: Subject to any disclaimer, the term of this patent is extended or adjusted under 35 U.S.C. 154(b) by 134 days.

(21) Appl. No.: 17/099,749

(22) Filed: Nov. 16, 2020

(65) Prior Publication Data

US 2021/0084448 A1  Mar. 18, 2021

Related U.S. Application Data

(63) Continuation-in-part of application No. 16/907,806, filed on Jun. 22, 2020, now Pat. No. 10,841,749, and
(Continued)

(51) Int. Cl.
*H04W 24/00* (2009.01)
*H04W 4/029* (2018.01)
(Continued)

(52) U.S. Cl.
CPC ........... *H04W 4/029* (2018.02); *G01S 5/0284* (2013.01); *H04B 17/318* (2015.01);
(Continued)

(58) Field of Classification Search
CPC .... H04W 12/12; H04W 12/122; H04W 12/79
(Continued)

(56) References Cited

U.S. PATENT DOCUMENTS 6,122,520 A   9/2000 Want et al.
6,442,485 B2  8/2002 Evans
(Continued)

FOREIGN PATENT DOCUMENTS

CN   102811481 A   12/2012
CN   105050055 A   11/2015
(Continued)

OTHER PUBLICATIONS

U.S. Appl. No. 17/099,749, filed Nov. 16, 2020, Cody Catalena.
(Continued)

*Primary Examiner* — Joseph Arevalo
(74) *Attorney, Agent, or Firm* — Basil M. Angelo; Angelo IP

(57) ABSTRACT

A method of passive asset tracking using observations of Wi-Fi access points includes associating unique identifying information of a Wi-Fi access point with a moveable asset in an asset tracking database, where the Wi-Fi access point is disposed on, attached to, or integrated, receiving observation data from a Wi-Fi AP Database including the unique identifying information of the Wi-Fi access point and location information of the Wi-Fi access point, determining a location of the moveable asset based, at least in part, on the observation data of the Wi-Fi access point, and storing the location of the moveable asset in the asset tracking database. There is no communication between the asset tracking database and one or more wireless devices that report an encounter with the Wi-Fi access point, comprising observation data, to the Wi-Fi AP Database.

26 Claims, 14 Drawing Sheets

Related U.S. Application Data a continuation-in-part of application No. 16/812,612, filed on Mar. 9, 2020, now Pat. No. 10,848,935, and a continuation-in-part of application No. 16/812,471, filed on Mar. 9, 2020, now Pat. No. 10,848,934, said application No. 16/907,806 is a continuation of application No. 16/570,195, filed on Sep. 13, 2019, now Pat. No. 10,728,709, said application No. 16/812,471 is a continuation-in-part of application No. 16/570,195, filed on Sep. 13, 2019, now Pat. No. 10,728,709, said application No. 16/812,612 is a continuation-in-part of application No. 16/570,195, filed on Sep. 13, 2019, now Pat. No. 10,728,709.

(51) Int. Cl.

| | | |
|---|---|---|
| *H04W 48/20* | (2009.01) | |
| *H04W 48/16* | (2009.01) | |
| *H04W 48/08* | (2009.01) | |
| *H04B 17/318* | (2015.01) | |
| *G01S 5/02* | (2010.01) | |
| *H04W 4/02* | (2018.01) | |

(52) U.S. Cl.
CPC ........... *H04W 4/023* (2013.01); *H04W 48/08* (2013.01); *H04W 48/16* (2013.01); *H04W 48/20* (2013.01)

(58) Field of Classification Search
USPC ... 455/456.1, 437, 522, 434, 39, 414.2, 450, 455/41.2, 410
See application file for complete search history.

(56) References Cited

U.S. PATENT DOCUMENTS

| | | | |
|---|---|---|---|
| 6,934,540 | B2 | 8/2005 | Twitchell, Jr. |
| 7,136,832 | B2 | 11/2006 | Li et al. |
| 7,155,238 | B2 | 12/2006 | Katz |
| 7,305,245 | B2 | 12/2007 | Alizadeh-Shabdiz et al. |
| 7,403,762 | B2 | 7/2008 | Morgan et al. |
| 7,411,921 | B2 | 8/2008 | Strong et al. |
| 7,414,988 | B2 | 8/2008 | Jones et al. |
| 7,433,694 | B2 | 10/2008 | Morgan et al. |
| 7,471,954 | B2 | 12/2008 | Brachet et al. |
| 7,474,897 | B2 | 1/2009 | Morgan et al. |
| 7,493,127 | B2 | 2/2009 | Morgan et al. |
| 7,515,578 | B2 | 4/2009 | Alizadeh-Shabdiz et al. |
| 7,551,579 | B2 | 6/2009 | Alizadeh-Shabdiz et al. |
| 7,551,929 | B2 | 6/2009 | Alizadeh-Shabdiz et al. |
| 7,558,852 | B2 | 7/2009 | Douglas et al. |
| 7,768,963 | B2 | 8/2010 | Alizadeh-Shabdiz |
| 7,769,396 | B2 | 8/2010 | Alizadeh-Shabdiz et al. |
| 7,778,649 | B2 | 8/2010 | Sharony et al. |
| 7,818,017 | B2 | 10/2010 | Alizadeh-Shabdiz et al. |
| 7,835,754 | B2 | 11/2010 | Alizadeh-Shabdiz et al. |
| 7,848,765 | B2 | 12/2010 | Phillips et al. |
| 7,856,234 | B2 | 12/2010 | Alizadeh-Shabdiz et al. |
| 7,860,648 | B2 | 12/2010 | Jung et al. |
| 7,916,661 | B2 | 3/2011 | Alizadeh-Shabdiz et al. |
| 7,999,742 | B2 | 8/2011 | Alizadeh-Shabdiz |
| 8,014,788 | B2 | 9/2011 | Alizadeh-Shabdiz et al. |
| 8,019,357 | B2 | 9/2011 | Alizadeh-Shabdiz et al. |
| 8,022,877 | B2 | 9/2011 | Alizadeh-Shabdiz |
| 8,031,657 | B2 | 10/2011 | Jones et al. |
| RE42,927 | E | 11/2011 | Want et al. |
| 8,054,219 | B2 | 11/2011 | Alizadeh-Shabdiz |
| 8,063,820 | B2 | 11/2011 | Alizadeh-Shabdiz |
| 8,089,398 | B2 | 1/2012 | Alizadeh-Shabdiz |
| 8,089,399 | B2 | 1/2012 | Alizadeh-Shabdiz |
| 8,090,386 | B2 | 1/2012 | Alizadeh-Shabdiz et al. |
| 8,103,288 | B2 | 1/2012 | Alizadeh-Shabdiz et al. |
| 8,130,148 | B2 | 3/2012 | Alizadeh-Shabdiz |
| 8,140,094 | B2 | 3/2012 | Morgan et al. |
| 8,144,673 | B2 | 3/2012 | Alizadeh-Shabdiz |
| 8,154,454 | B2 | 4/2012 | Alizadeh-Shabdiz |
| 8,155,666 | B2 | 4/2012 | Alizadeh-Shabdiz |
| 8,155,673 | B2 | 4/2012 | Alizadeh-Shabdiz et al. |
| 8,185,129 | B2 | 5/2012 | Alizadeh-Shabdiz |
| 8,223,074 | B2 | 7/2012 | Alizadeh-Shabdiz |
| 8,229,455 | B2 | 7/2012 | Alizadeh-Shabdiz |
| 8,242,960 | B2 | 8/2012 | Alizadeh-Shabdiz |
| 8,244,272 | B2 | 8/2012 | Morgan et al. |
| 8,279,114 | B2 | 10/2012 | Alizadeh-Shabdiz et al. |
| 8,284,103 | B2 | 10/2012 | Alizadeh-Shabdiz |
| 8,300,603 | B2 | 10/2012 | Chowdhury et al. |
| 8,314,704 | B2 | 11/2012 | Cova et al. |
| 8,315,233 | B2 | 11/2012 | Alizadeh-Shabdiz |
| 8,315,598 | B2 | 11/2012 | Price |
| 8,369,264 | B2 | 2/2013 | Brachet et al. |
| 8,374,630 | B2 | 2/2013 | Duxbury et al. |
| 8,406,785 | B2 | 3/2013 | Alizadeh-Shabdiz et al. |
| 8,433,334 | B2 | 4/2013 | Huang et al. |
| 8,447,332 | B2 | 5/2013 | Weinreich et al. |
| 8,462,745 | B2 | 6/2013 | Alizadeh-Shabdiz |
| 8,478,297 | B2 | 7/2013 | Morgan et al. |
| 8,526,967 | B2 | 9/2013 | Alizadeh-Shabdiz et al. |
| 8,538,457 | B2 | 9/2013 | Morgan et al. |
| 8,559,974 | B2 | 10/2013 | Alizadeh-Shabdiz et al. |
| 8,564,481 | B2 | 10/2013 | Alizadeh-Shabdiz |
| 8,570,373 | B2 | 10/2013 | Variyath et al. |
| 8,577,392 | B1 | 11/2013 | Pai et al. |
| 8,594,703 | B2 | 11/2013 | Price et al. |
| 8,606,294 | B2 | 12/2013 | Alizadeh-Shabdiz |
| 8,619,643 | B2 | 12/2013 | Alizadeh-Shabdiz et al. |
| 8,630,657 | B2 | 1/2014 | Alizadeh-Shabdiz et al. |
| 8,630,664 | B2 | 1/2014 | Alizadeh-Shabdiz et al. |
| 8,638,256 | B2 | 1/2014 | Alizadeh-Shabdiz et al. |
| 8,638,725 | B2 | 1/2014 | Alizadeh-Shabdiz |
| 8,644,852 | B2 | 2/2014 | Jones et al. |
| 8,669,902 | B2 | 3/2014 | Pandey et al. |
| 8,700,053 | B2 | 4/2014 | Alizadeh-Shabdiz et al. |
| 8,700,060 | B2 | 4/2014 | Huang |
| 8,706,140 | B2 | 4/2014 | Alizadeh-Shabdiz |
| 8,837,363 | B2 | 9/2014 | Jones et al. |
| 8,890,746 | B2 | 11/2014 | Alizadeh-Shabdiz et al. |
| 8,909,245 | B2 | 12/2014 | Alizadeh-Shabdiz et al. |
| 8,965,412 | B2 | 2/2015 | Alizadeh-Shabdiz et al. |
| 8,971,915 | B2 | 3/2015 | Alizadeh-Shabdiz et al. |
| 8,971,923 | B2 | 3/2015 | Alizadeh-Shabdiz et al. |
| 8,983,493 | B2 | 3/2015 | Brachet et al. |
| 8,983,504 | B2 | 3/2015 | Alizadeh-Shabdiz et al. |
| 8,989,773 | B2 | 3/2015 | Sandel et al. |
| 8,996,032 | B2 | 3/2015 | Alizadeh-Shabdiz et al. |
| 9,001,743 | B2 | 4/2015 | Alizadeh-Shabdiz |
| 9,008,690 | B2 | 4/2015 | Alizadeh-Shabdiz et al. |
| 9,008,700 | B2 | 4/2015 | Mukkavilli et al. |
| 9,013,350 | B2 | 4/2015 | Alizadeh-Shabdiz |
| 9,014,715 | B2 | 4/2015 | Alizadeh-Shabdiz et al. |
| 9,031,580 | B2 | 5/2015 | Alizadeh-Shabdiz |
| 9,037,160 | B2 | 5/2015 | Jones et al. |
| 9,037,162 | B2 | 5/2015 | Morgan et al. |
| 9,052,378 | B2 | 6/2015 | Alizadeh-Shabdiz et al. |
| 9,055,395 | B2 | 6/2015 | Hart et al. |
| 9,103,900 | B2 | 8/2015 | Alizadeh-Shabdiz |
| RE45,808 | E | 11/2015 | Sheynblat et al. |
| 9,237,415 | B2 | 1/2016 | Alizadeh-Shabdiz et al. |
| 9,250,085 | B2 | 2/2016 | Hwang et al. |
| 9,253,605 | B2 | 2/2016 | Alizadeh-Shabdiz et al. |
| 9,277,369 | B2 | 3/2016 | Lindskog et al. |
| 9,279,114 | B2 | 3/2016 | Lassen et al. |
| 9,279,877 | B2 | 3/2016 | Alizadeh-Shabdiz |
| 9,298,897 | B2 | 3/2016 | Broadstone et al. |
| 9,363,785 | B2 | 6/2016 | Alizadeh-Shabdiz et al. |
| 9,369,845 | B2 | 6/2016 | Alizadeh-Shabdiz et al. |
| 9,369,884 | B2 | 6/2016 | Jones et al. |
| 9,392,407 | B2 | 7/2016 | Brachet et al. |
| 9,398,558 | B2 | 7/2016 | Morgan et al. |
| 9,408,031 | B1 | 8/2016 | Steger et al. |
| 9,408,037 | B1 | 8/2016 | Alizadeh-Shabdiz et al. |
| 9,426,613 | B2 | 8/2016 | Alizadeh-Shabdiz et al. |
| 9,445,239 | B2 | 9/2016 | Reddy |
| 9,467,807 | B2 | 10/2016 | Alizadeh-Shabdiz |

(56) References Cited

U.S. PATENT DOCUMENTS

| | | | |
|---|---|---|---|
| 9,497,596 B2 | 11/2016 | Cho et al. | |
| 9,516,471 B2 | 12/2016 | Alizadeh-Shabdiz et al. | |
| 9,521,512 B2 | 12/2016 | Alizadeh-Shabdiz et al. | |
| 9,554,247 B2 | 1/2017 | Jones et al. | |
| 9,565,523 B1 | 2/2017 | Steger et al. | |
| 9,572,026 B2 | 2/2017 | Hart et al. | |
| 9,612,315 B2 | 4/2017 | Sutton et al. | |
| 9,628,958 B1* | 4/2017 | McBurney | H04W 4/027 |
| 9,639,557 B2 | 5/2017 | Arslan et al. | |
| 9,658,315 B2 | 5/2017 | Pandey et al. | |
| 9,693,194 B2 | 6/2017 | Pandey et al. | |
| 9,726,752 B2 | 8/2017 | Attar et al. | |
| 9,817,101 B2 | 11/2017 | Jones et al. | |
| 9,832,633 B2 | 11/2017 | Gerber, Jr. et al. | |
| 9,915,721 B2 | 3/2018 | Alizadeh-Shabdiz | |
| 9,918,295 B2 | 3/2018 | Jones et al. | |
| 9,924,311 B2 | 3/2018 | Steger et al. | |
| 9,936,348 B2 | 4/2018 | Alizadeh-Shabdiz et al. | |
| 9,936,442 B1 | 4/2018 | Noonan et al. | |
| 9,955,358 B2 | 4/2018 | Alizadeh-Shabdiz et al. | |
| 10,021,554 B2 | 7/2018 | Abraham et al. | |
| 10,031,237 B2 | 7/2018 | Alizadeh-Shabdiz | |
| 10,034,265 B2 | 7/2018 | Alizadeh-Shabdiz et al. | |
| 10,080,208 B2 | 9/2018 | Morgan et al. | |
| 10,082,558 B2 | 9/2018 | Tee et al. | |
| 10,098,085 B1 | 10/2018 | Overcash | |
| 10,104,503 B2 | 10/2018 | Pandey et al. | |
| 10,114,123 B2 | 10/2018 | Alizadeh-Shabdiz et al. | |
| 10,217,078 B1 | 2/2019 | Klein | |
| 10,284,997 B2 | 5/2019 | Alizadeh-Shabdiz et al. | |
| 10,304,086 B2 | 5/2019 | Broadstone et al. | |
| 10,305,854 B2 | 5/2019 | Alizadeh-Shabdiz et al. | |
| 10,317,507 B2 | 6/2019 | Alizadeh-Shabdiz | |
| 10,361,994 B2 | 7/2019 | Alizadeh-Shabdiz et al. | |
| 10,390,173 B2 | 8/2019 | Alizadeh-Shabdiz et al. | |
| 10,448,210 B2 | 10/2019 | Pandey et al. | |
| 10,459,593 B2 | 10/2019 | Tiwari et al. | |
| 10,491,563 B2 | 11/2019 | Alizadeh-Shabdiz et al. | |
| 10,536,428 B2 | 1/2020 | Alizadeh-Shabdiz et al. | |
| 10,572,700 B2 | 2/2020 | Sengstaken, Jr. | |
| 10,594,650 B2 | 3/2020 | Alizadeh-Shabdiz et al. | |
| 10,681,511 B1 | 6/2020 | Alizadeh-Shabdiz et al. | |
| 10,698,073 B2 | 6/2020 | Smith et al. | |
| 10,708,366 B2 | 7/2020 | Douglas et al. | |
| 10,715,961 B2 | 7/2020 | Stern et al. | |
| 10,721,708 B1 | 7/2020 | Mukherji et al. | |
| 10,728,709 B1 | 7/2020 | Catalena | |
| 10,783,419 B2 | 9/2020 | Singh | |
| 10,791,419 B2 | 9/2020 | Santo et al. | |
| 10,798,525 B2 | 10/2020 | Houri | |
| 10,841,749 B1 | 11/2020 | Catalena | |
| 10,848,934 B1 | 11/2020 | Catalena | |
| 10,848,935 B1 | 11/2020 | Catalena | |
| 2002/0098852 A1 | 7/2002 | Goren et al. | |
| 2003/0210142 A1 | 11/2003 | Freathy et al. | |
| 2004/0004663 A1* | 1/2004 | Kahn | H04N 1/00127 348/207.1 |
| 2004/0004737 A1* | 1/2004 | Kahn | H04N 1/00145 358/1.15 |
| 2006/0009240 A1 | 1/2006 | Katz | |
| 2006/0046709 A1 | 3/2006 | Krumm et al. | |
| 2009/0146832 A1 | 6/2009 | Ebert et al. | |
| 2010/0076902 A1 | 3/2010 | Kraft | |
| 2010/0090822 A1 | 4/2010 | Benson et al. | |
| 2010/0102964 A1 | 4/2010 | Steer | |
| 2010/0141445 A1 | 6/2010 | Venkatasubramaniyam et al. | |
| 2010/0272093 A1* | 10/2010 | Raravi | G05B 19/4185 370/348 |
| 2010/0321181 A1 | 12/2010 | Broadbent | |
| 2011/0012731 A1 | 1/2011 | Stevens | |
| 2011/0051665 A1 | 3/2011 | Huang | |
| 2011/0087662 A1* | 4/2011 | Darby, Jr. | G06Q 50/08 707/812 |
| 2011/0133888 A1 | 6/2011 | Stevens et al. | |
| 2012/0126974 A1 | 5/2012 | Phillips et al. | |
| 2013/0214909 A1 | 8/2013 | Meijers et al. | |
| 2014/0003286 A1* | 1/2014 | Estevez | H04W 48/02 370/254 |
| 2014/0050320 A1* | 2/2014 | Choyi | H04W 12/06 380/270 |
| 2014/0204926 A1* | 7/2014 | Ota | H04W 48/16 370/338 |
| 2014/0355523 A1* | 12/2014 | Congdon | H04W 48/12 370/328 |
| 2014/0378163 A1 | 12/2014 | Dicke et al. | |
| 2015/0180816 A1 | 6/2015 | Varoglu et al. | |
| 2015/0208454 A1 | 7/2015 | Cho et al. | |
| 2015/0223082 A1 | 8/2015 | Negus et al. | |
| 2015/0312404 A1 | 10/2015 | Abramson et al. | |
| 2016/0066155 A1 | 3/2016 | Fan et al. | |
| 2016/0192374 A1* | 6/2016 | Negus | H04L 5/0085 370/280 |
| 2017/0041862 A1* | 2/2017 | Chen | H04W 48/16 |
| 2017/0118530 A1* | 4/2017 | Amano | H04N 21/6175 |
| 2017/0219676 A1 | 8/2017 | Fran et al. | |
| 2017/0238136 A1 | 8/2017 | Smith | |
| 2017/0337522 A1* | 11/2017 | Bennett | H04W 4/025 |
| 2018/0018618 A1 | 1/2018 | Groseclose | |
| 2018/0069650 A1 | 3/2018 | Fran et al. | |
| 2018/0295519 A1* | 10/2018 | Nandha Premnath | H04L 63/1425 |
| 2018/0322376 A1 | 11/2018 | Henry et al. | |
| 2019/0050806 A1 | 2/2019 | Klein | |
| 2019/0174289 A1* | 6/2019 | Martin | H04W 4/90 |
| 2019/0182627 A1 | 6/2019 | Thoresen et al. | |
| 2020/0049837 A1 | 2/2020 | Werner et al. | |
| 2020/0337162 A1 | 10/2020 | Perkins et al. | |
| 2021/0060686 A1* | 3/2021 | Rappl | B23K 9/32 |
| 2022/0124658 A1* | 4/2022 | Beale | H04B 17/318 |

FOREIGN PATENT DOCUMENTS

| | | |
|---|---|---|
| TW | 201918103 A | 5/2019 |
| WO | 2011008884 A1 | 1/2011 |
| WO | 2011022412 A1 | 2/2011 |
| WO | 2011025821 A1 | 3/2011 |
| WO | 2011025987 A1 | 3/2011 |
| WO | 2021050209 A1 | 3/2021 |
| WO | 2021050210 A1 | 3/2021 |
| WO | 2021050211 A1 | 3/2021 |

OTHER PUBLICATIONS

U.S. Appl. No. 17/102,151, filed Nov. 23, 2020, Cody Catalena.
U.S. Appl. No. 17/102,429, filed Nov. 23, 2020, Cody Catalena.
Applicant reply to non-final office action in U.S. Appl. No. 16/570,195, filed Jan. 27, 2020.
Applicant reply to non-final office action in U.S. Appl. No. 16/812,471, filed Jul. 13, 2020.
Applicant reply to non-final office action in U.S. Appl. No. 16/812,612, filed Jul. 7, 2020.
PCT International Search Report of the International Search Authority (USPTO) for PCT/US2020/046667, filed Aug. 17, 2020, dated Nov. 18, 2020.
PCT International Search Report of the International Search Authority (USPTO) for PCT/US2021/021384, filed on Mar. 8, 2021, dated May 27, 2021.
PCT International Search Report of the International Search Authority (USPTO) for PCT/US2021/021387, filed on Mar. 8, 2021, dated Jun. 3, 2021.
PCT International Search Report of the International Search Authority (USPTO) for PCT/US2021/021391, filed on Mar. 8, 2021, dated Jun. 3, 2021.
PCT Written Opinion on Patentability by International Search Authority (USPTO) for PCT/US2020/046667, filed Aug. 17, 2020, dated Nov. 18, 2020.
PCT Written Opinion on Patentability by International Search Authority (USPTO) for PCT/US2021/021384, filed on Mar. 8, 2021, dated May 27, 2021.

(56) References Cited

OTHER PUBLICATIONS

PCT Written Opinion on Patentability by International Search Authority (USPTO) for PCT/US2021/021387, filed on Mar. 8, 2021, dated Jun. 3, 2021.

PCT Written Opinion on Patentability by International Search Authority (USPTO) for PCT/US2021/021391, filed on Mar. 8, 2021, dated Jun. 3, 2021.

U.S. Appl. No. 16/812,471, filed Mar. 9, 2020, Cody Catalena.

U.S. Appl. No. 16/812,612, filed Mar. 9, 2020, Cody Catalena.

U.S. Appl. No. 16/907,806, filed Jun. 22, 2020, Cody Catalena.

PCT International Search Report for PCT International Application PCT/US2020/046657, international filing date Aug. 17, 2020, dated Sep. 14, 2020.

PCT International Search Report for PCT International Application PCT/US2020/046662, filed Aug. 17, 2020, dated Sep. 29, 2020.

PCT Written Opinion of the International Search Authority (USPTO) in PCT International Application PCT/JS2020/046657, international filing date Aug. 17, 2020, dated Sep. 14, 2020.

PCT Written Opinion of the International Search Authority (USPTO) in PCT International Application PCT/JS2020/046662, filed Aug. 17, 2020, dated Sep. 29, 2020.

Applicant reply to USPTO non-final office action issued in U.S. Appl. No. 17/102,429, filed Nov. 23, 2020, dated Dec. 6, 2022.

China National Intellectual Property Administration office action issued in Chinese patent application 202080063959.3, dated Aug. 1, 2022.

China National Intellectual Property Administration office action issued in PRC Patent Application 202080063842.5, dated Jul. 13, 2022.

China National Intellectual Property Administration office action issued in PRC patent application 202080063876.4 dated Jul. 20, 2022.

USPTO non-final office action issued in U.S. Pat. App. U.S. Appl. No. 17/102,151, filed Nov. 23, 2020, dated Sep. 19, 2022.

USPTO non-final office action issued in U.S. Appl. No. 17/102,429, filed Nov. 23, 2020, dated Jul. 7, 2022.

USPTO non-final office action issued in U.S. Appl. No. 16/570,195, filed Sep. 13, 2019, dated Nov. 21, 2019.

USPTO non-final office action issued in U.S. Appl. No. 16/812,471, filed Mar. 9, 2020, dated Apr. 13, 2020.

USPTO non-final office action issued in U.S. Appl. No. 16/812,612, filed Mar. 9, 2020, dated Apr. 8, 2020.

USPTO Notice of Allowance for U.S. Appl. No. 16/570,195, filed Sep. 13, 2019, dated Apr. 30, 2020.

USPTO Notice of Allowance for U.S. Appl. No. 16/812,471, filed Mar. 9, 2020, dated Sep. 10, 2020.

USPTO Notice of Allowance for U.S. Appl. No. 16/812,612, filed Mar. 9, 2020, dated Sep. 9, 2020.

USPTO Notice of Allowance for U.S. Appl. No. 16/907,806, filed Jun. 22, 2020, dated Jul. 24, 2020.

\* cited by examiner

300

| Subtype Bits | Subtype Description |
|---|---|
| 0000 | Association Request |
| 0001 | Association Response |
| 0010 | Reassociation Request |
| 0011 | Reassociation Response |
| 0100 | Probe Request |
| *0101* | *Probe Response* |
| 0110 | Timing Advertisement |
| 0111 | Reserved |
| *1000* | *Beacon* |
| 1001 | Announcement Traffic Indication Message (ATIM) |
| 1010 | Dissociation |
| 1011 | Authentication |
| 1100 | Deauthentication |
| 1101 | Action |
| 1110 | Action No Ack (NACK) |
| 1111 | Reserved |

| Time | Date | GPS LAT | GPS LNG | SSID | BSSID | Signal Strength |
|---|---|---|---|---|---|---|
| 2:02 | 1-Sep | 30.613181 N | 96.339878 W | Asset1 | BSSID1 | 25% |
| 2:05 | 1-Sep | 30.621315 N | 96.335597 W | Asset1 | BSSID1 | 75% |
| 3:04 | 1-Sep | 30.621315 N | 96.337564 W | Asset1 | BSSID1 | 95% |
| 4:23 | 1-Sep | 30.519234 N | 96.299430 W | Asset2 | BSSID2 | 56% |
| 9:59 | 2-Sep | 30.595311 N | 96.284302 W | Asset3 | BSSID3 | 45% |

| Time | Date | GPS LAT | GPS LNG | SSID | Asset BSSID | Signal Strength | AP LK LAT | AP LK LNG | AP CUR LAT | AP CUR LNG |
|---|---|---|---|---|---|---|---|---|---|---|
| 2:02 | 1-Sep | 30.613181N | 96.339878W | Asset1 | BSSID1 | 25% | 30.624754 | 96.548265 | 30.620123 | 96.338854 |
| 2:05 | 1-Sep | 30.621315N | 96.335597W | Asset1 | BSSID1 | 75% | 30.624754 | 96.317456 | 30.620950 | 96.337554 |
| 3:04 | 1-Sep | 30.621315N | 96.337564W | Asset1 | BSSID1 | 95% | 30.629432 | 96.310222 | 30.621310 | 96.337421 |
| 4:23 | 1-Sep | 30.519234N | 96.299430W | Asset2 | BSSID2 | 56% | 30.519234 | 96.312430 | 30.519234 | 96.299430 |
| 9:59 | 2-Sep | 30.595311N | 96.284302W | Asset3 | BSSID3 | 45% | 30.602451 | 96.284302 | 30.595311 | 96.284302 |

FIG. 7C

PASSIVE ASSET TRACKING USING OBSERVATIONS OF WI-FI ACCESS POINTS

CROSS-REFERENCE TO RELATED APPLICATIONS

This application is a continuation-in-part of U.S. patent application Ser. No. 16/907,806, filed on Jun. 22, 2020, and issued as U.S. Pat. No. 10,841,749, on Nov. 17, 2020, which is a continuation of U.S. patent application Ser. No. 16/570,195, filed on Sep. 13, 2019, and issued as U.S. Pat. No. 10,728,709, on Jul. 28, 2020.

This application is a continuation-in-part of U.S. patent application Ser. No. 16/812,471, filed on Mar. 9, 2020, and issued as U.S. Pat. No. 10,848,934, on Nov. 24, 2020, which is a continuation-in-part of U.S. patent application Ser. No. 16/570,195, filed on Sep. 13, 2019, and issued as U.S. Pat. No. 10,728,709, on Jul. 28, 2020.

This application is a continuation-in-part of U.S. patent application Ser. No. 16/812,612, filed on Mar. 9, 2020, and issued as U.S. Pat. No. 10,848,935, on Nov. 24, 2020, which is a continuation-in-part of U.S. patent application Ser. No. 16/570,195, filed on Sep. 13, 2019, and issued as U.S. Pat. No. 10,728,709, on Jul. 28, 2020.

All of the above-referenced patent applications are hereby incorporated by reference in their entirety.

BACKGROUND OF THE INVENTION

Wireless networking refers to the wireless exchange of information between network nodes with electromagnetic signaling. Standards setting organizations, such as the Institute of Electrical and Electronics Engineers ("IEEE"), coordinate, develop, promulgate, and maintain technical standards that facilitate implementation of wireless network standards that ensure compatibility between competing original equipment manufacturers and thereby seek to achieve widespread adoption of their respective technologies. The ubiquitous IEEE 802.11 standard specifies a Wireless Local Area Network ("WLAN") technology, commonly referred to as Wi-Fi, that facilitates wireless communication between devices and often serves as a bridge to a network carrying Internet Protocol traffic. Wi-Fi typically operates at either the 2.4 GHz or 5 GHz frequency bands in the radio portion of the electromagnetic spectrum.

In its first iterations, the IEEE 802.11a/b standards specified transfer rates of up to 11 Mbps at a range of up to 150 feet. The IEEE 802.11g amendment implemented various improvements, including Orthogonal Frequency Division Multiplexing ("OFDM"), to increase transfer rates to up to 54 Mbps while maintaining backward compatibility with IEEE 802.11b. The IEEE 802.11n amendment added Multiple Input Multiple Output ("MIMO") functionality where multiple transmitters and receivers operate simultaneously at one or both ends of the link to facilitate transfer rates of up to 300 Mbps and even higher if additional antennae are used. The IEEE 802.11ac amendment added support for spatial streams and increased channel widths to substantially increase transfer rates from 433 Mbps to several Gbps and works exclusively in the less crowded 5 GHz frequency band and at a range of up to 300 feet or more.

The IEEE 802.11 standard remains an evolving technical standard and future amendments will likely seek to increase transfer rates, improve connectivity in challenging environments, and enhance security. As such, Wi-Fi remains the most widely adopted wireless networking standard in the world.

BRIEF SUMMARY OF THE INVENTION

According to one aspect of one or more embodiments of the present invention, a method of passive asset tracking using observations of Wi-Fi access points includes associating unique identifying information of a Wi-Fi access point with a moveable asset in an asset tracking database, wherein the Wi-Fi access point is disposed on, attached to, or integrated with the moveable asset, receiving observation data from a Wi-Fi AP Database including the unique identifying information of the Wi-Fi access point and location information of the Wi-Fi access point, determining a location of the moveable asset based, at least in part, on the observation data of the Wi-Fi access point, and storing the location of the moveable asset in the asset tracking database. There is no communication between the asset tracking database and one or more wireless devices that report an encounter with the Wi-Fi access point, including observation data, to the Wi-Fi AP Database.

According to one aspect of one or more embodiments of the present invention, a method of passive asset tracking using observations of Wi-Fi access points includes associating unique identifying information of a Wi-Fi access point with a moveable asset in an asset tracking database, wherein the Wi-Fi access point is disposed on, attached to, or integrated with the moveable asset, receiving first observation data from one or more direct reporting wireless devices that encounter the Wi-Fi access point including the unique identifying information of the Wi-Fi access point and first location information of the Wi-Fi access point, receiving second observation data from a Wi-Fi AP Database including the unique identifying information of the Wi-Fi access point and second location information of the Wi-Fi access point, determining a location of the moveable asset based, at least in part, on the first and/or the second observation data of the Wi-Fi access point, and storing the location of the moveable asset in the asset tracking database. There is no communication between the asset tracking database and one or more indirect reporting wireless devices that report their respective encounters with the Wi-Fi access point, including second observation data, to the Wi-Fi AP Database.

According to one aspect of one or more embodiments of the present invention, a method of passive asset tracking using observations of Wi-Fi access points includes associating unique identifying information of a Wi-Fi access point with a moveable asset in an asset tracking database, wherein the Wi-Fi access point is disposed on, attached to, or integrated with the moveable asset, receiving observation data from one or more wireless devices that encounter the Wi-Fi access point including the unique identifying information of the Wi-Fi access point and location information of the Wi-Fi access point, determining a location of the moveable asset based, at least in part, on the observation data of the Wi-Fi access point, and storing the location of the moveable asset in the asset tracking database.

Other aspects of the present invention will be apparent from the following description and claims.

BRIEF DESCRIPTION OF THE DRAWINGS

FIG. 3A shows the subtypes of IEEE 802.11 management frames.

FIG. 7B shows an example of observation data of one or more Wi-Fi access points reported by a wireless device based on an encounter in accordance with one or more embodiments of the present invention.

FIG. 7C shows an example of asset data stored or generated by an asset tracking database in accordance with one or more embodiments of the present invention.

DETAILED DESCRIPTION OF THE INVENTION

Figure 1:
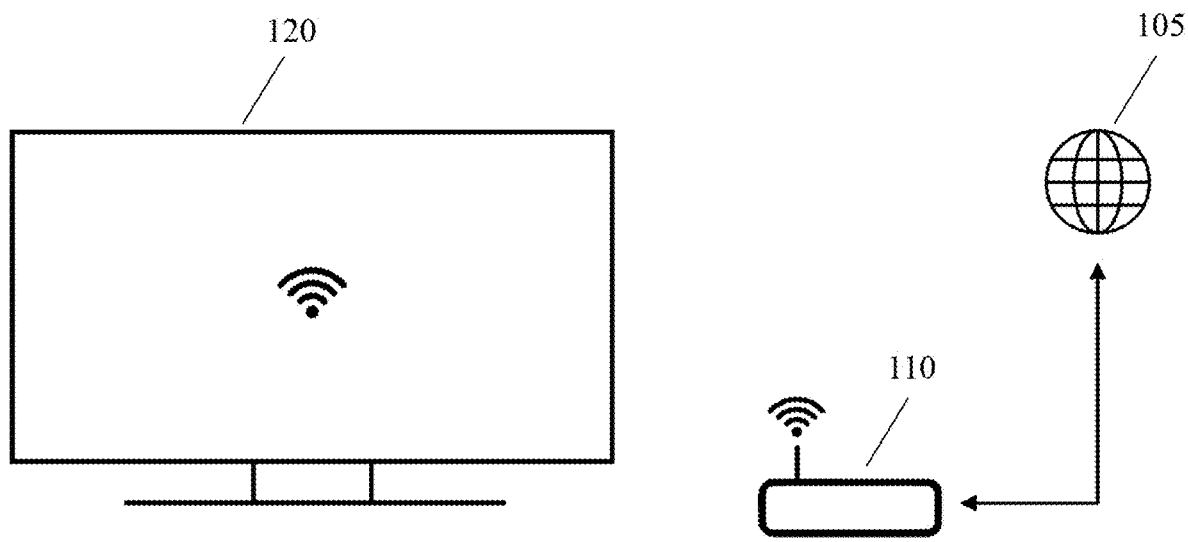
FIG. 1 shows a conventional Wi-Fi wireless network.
Figure 1:
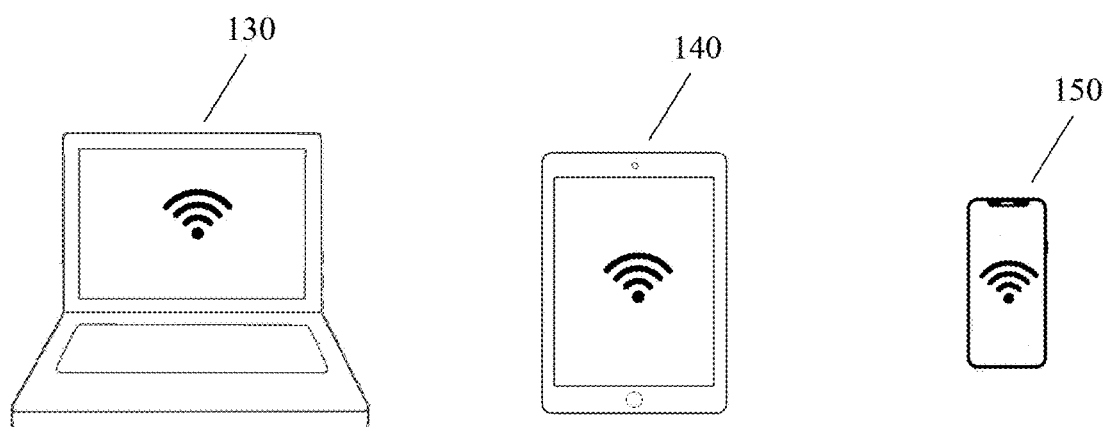

One or more embodiments of the present invention are described in detail with reference to the accompanying figures. For consistency, like elements in the various figures are denoted by like reference numerals. In the following detailed description of the present invention, specific details are described in order to provide a thorough understanding of the present invention. In other instances, aspects that are well-known to one of ordinary skill in the art are not described to avoid obscuring the description of the present invention.

Conventional asset tracking systems use dedicated and complicated hardware and software systems to track physical assets, typically within the confines of a fixed location (e.g., within a warehouse) or from portal-to-portal of one or more fixed locations (e.g., tracking departures from a warehouse and arrivals at a distributor). Some asset tracking systems use simple printed asset tracking tags configured to be optically read by a reading device, such as, for example, a barcode reader or Quick Response ("QR") reader. Other asset tracking systems use asset tracking tags configured to be read by short-range communication devices in the immediate vicinity of the tag using, for example, Near-Field Communication ("NFC"), Bluetooth Low Energy ("BLE"), Radio-Frequency Identification ("RFID"), or other short-range communication technologies. Still other asset tracking systems use asset tracking tags configured to be read at a distance using Long Range ("LoRa") networks or cellular communications. In some cases, the asset tracking system uses asset tracking tags capable of determining their own location using the Global Positioning System ("GPS") and directly reporting their own location to the asset tracking system over a communication network. However, such systems require substantial power, unobstructed access to satellite signals, and communications capabilities to self-report their location.

These conventional asset tracking systems may be referred to as closed network systems because dedicated hardware and software systems are purposefully deployed and engaged in the asset tracking task. The asset tags must be directly read by a reader or short-range communication device in the immediate vicinity of the tag or the asset tag must be capable of determining its own location and directly reporting its own location to the asset tracking system. Thus, an inherent limitation in conventional closed network asset tracking systems is the requirement that the tagging, tracking, hardware, and software systems must be intentionally deployed, span the zone of coverage, and affirmatively perform and manage the asset tracking task. This requires extensive investment in expensive hardware and software systems and in hiring and training personnel on its usage. Moreover, in a widespread deployment of assets across many sites, perhaps even around the world, it is exceptionally difficult, if even possible, and cost prohibitive to deploy and manage a conventional closed network asset tracking system.

Accordingly, in one or more embodiments of the present invention, a method and system of passive asset tracking uses observations of Wi-Fi access points to passively track moveable assets. In certain embodiments, a Wi-Fi access point may be disposed on, attached to, or integrated with a moveable asset to be tracked and logically associated in an asset tracking database. The moveable asset may then be deployed in the field or otherwise used in a typical manner. In contrast to closed network asset tracking systems, the moveable asset is passively tracked only when its Wi-Fi access point (logically associated in the asset tracking database) is encountered by a Wi-Fi enabled wireless device (without requiring an awareness on the part of the user of the wireless device that he or she is participating in the asset tracking task). In certain embodiments, when one or more wireless devices come into Wi-Fi signaling range of the Wi-Fi access point associated with the moveable asset to be tracked, a wireless device reports its encounter with the Wi-Fi access point to a Wi-Fi AP Database that is typically used to improve location services. The report includes observation data including at least the unique identifying information of the Wi-Fi access point encountered and location information that may be used to determine the location of the Wi-Fi access point. The asset tracking database may receive observation data directly from one or more reporting wireless devices that encounter the Wi-Fi access point and/or indirectly from a Wi-Fi AP Database that receives observation data from one or more reporting wireless devices that encounter the Wi-Fi access point and report the observation data to the Wi-Fi AP Database. The terms direct and indirect are used in reference to the asset tracking database. The asset tracking database may determine a location of a moveable asset based, at least in part, on observation data of the associated Wi-Fi access point. In this way, a moveable asset may be deployed anywhere in the world with a Wi-Fi access point that is not required to associate with any wireless device or provide any network connectivity of any kind. Every smartphone in the world that merely happens to come into Wi-Fi signaling range of the Wi-Fi access point, even if only temporarily, may anonymously and without awareness participate in the asset tracking task by reporting observation data of the Wi-Fi access point that the asset tracking database may receive and use to determine the location of the movable asset.

The method and system of passive asset tracking leverages existing infrastructure inherent in smartphones and smartphone operating systems to report the unique identifying information of Wi-Fi access points they encounter as well as their location for improving the accuracy of location-based services. Advantageously, the Wi-Fi wireless network discovery protocol as well as the inherent Wi-Fi access point reporting feature of smartphones may be cooperatively used to passively track Wi-Fi access points associated with moveable assets by one or more wireless devices without requiring that the wireless devices authenticate to, associate with, or establish connectivity with any particular Wi-Fi access point, using publicly accessibly Wi-Fi signals, and in passive scanning applications, completely anonymously with respect to the asset tracking task.

FIG. 1 shows a conventional Wi-Fi wireless network 100. A Wi-Fi access point 110 facilitates wireless connectivity between one or more of the wireless devices and, in configurations that include an integrated router, may serve as the bridge between the wireless devices (e.g., 120, 130, 140, and 150) and an upstream network connection, such as, for example, the Internet connection provided by broadband modem 105. In conventional use, a wireless connection may be established between one or more wireless devices (e.g., 120, 130, 140, and 150), including, for example, television 120, computer 130, tablet computer 140, smartphone 150, or any other wireless device and Wi-Fi access point 110, thereby allowing the wireless devices (e.g., 120, 130, 140, and 150) to communicate with one another and/or access the Internet via broadband modem 105. Wi-Fi access points 110 are commonly found in homes, offices, and public places, where they are often referred to as Wi-Fi hotspots. While the number of Wi-Fi access points 110 has not been definitively counted, there are believed to be in excess of thirteen billion Wi-Fi access points (e.g., 110) around the world. Efforts to map Wi-Fi signal coverage suggest that most modern cities are blanketed with publicly accessible Wi-Fi signals. Notwithstanding the above, one of ordinary skill in the art will recognize that a conventional Wi-Fi wireless network 100 does not require a broadband modem 105 or Internet connectivity and may be used as a purely wireless network to facilitate wireless communications between one or more wireless devices (e.g., 120, 130, 140, and 150).

Figure 2A:
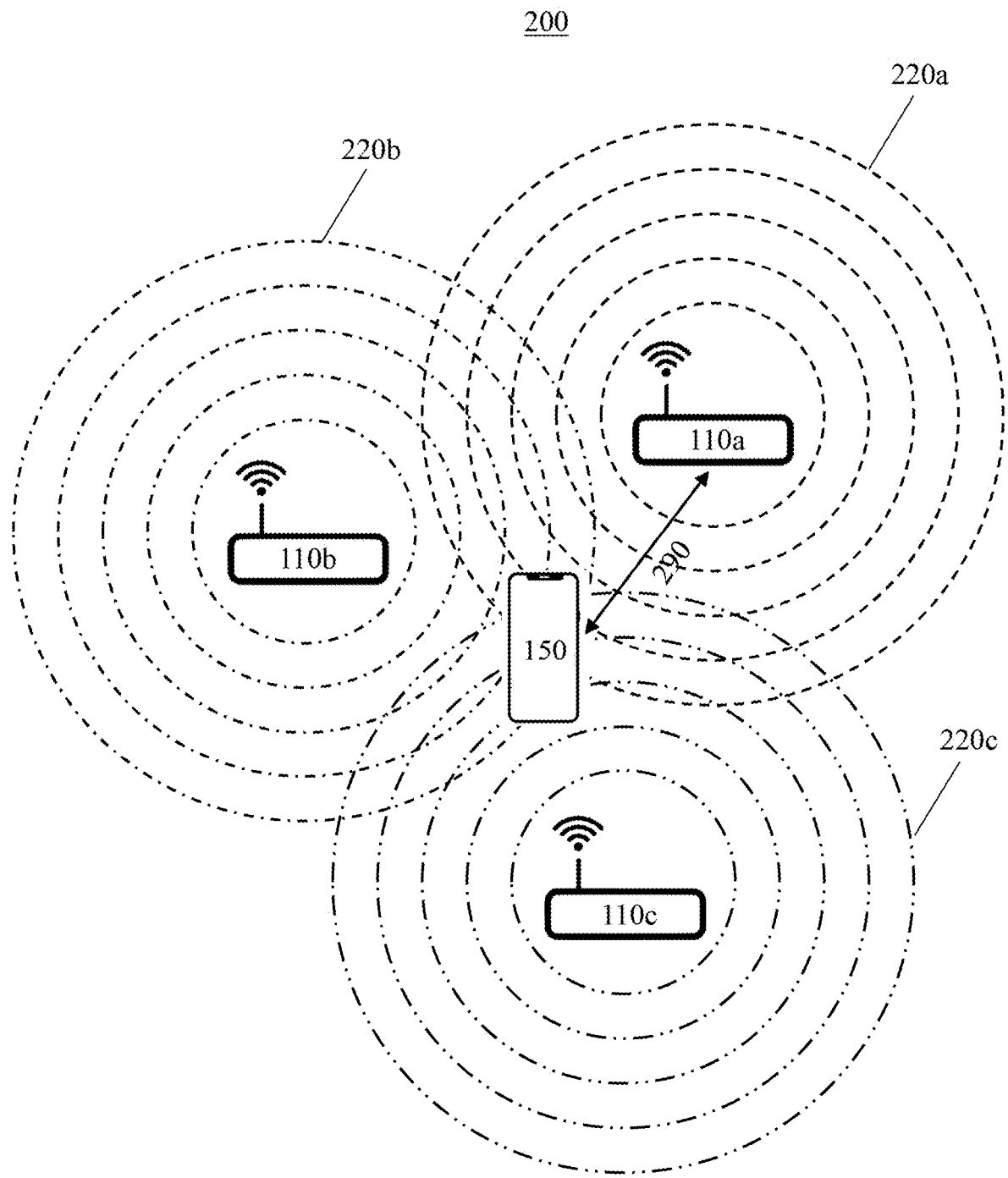
FIG. 2A shows a passive scanning mode as part of IEEE 802.11 Wi-Fi wireless network discovery process.

FIG. 2A shows a passive scanning mode 200 as part of the IEEE 802.11 Wi-Fi wireless network discovery process. Wi-Fi wireless network discovery is the process by which a wireless device identifies and potentially authenticates to, associates with, and establishes data-exchanging connectivity with an in-range Wi-Fi access point (e.g., 110). In passive scanning mode, one or more wireless devices (e.g., 150) listen for beacon frames (e.g., 220) broadcast at periodic intervals by one or more in-range Wi-Fi access points (e.g., 110) to announce the presence of their respective Wi-Fi wireless networks. A beacon frame (e.g., 220) is a type of Wi-Fi management frame that includes information regarding the broadcasting Wi-Fi access point (e.g., 110) to facilitate potential authentication, association, and connectivity. Each beacon frame (e.g., 220) includes a Service Set Identifier ("SSID"), which is typically a user-given name for the broadcasting Wi-Fi wireless network, and information that uniquely identifies the Wi-Fi access point (e.g., 110) including, but not limited to, a unique Basic Service Set Identifier ("BSSID") or Media Access Control ("MAC") address of the Wi-Fi access point (e.g., 110) or a broadcasting band thereof. Multiple Wi-Fi access points (e.g., 110) may share the same SSID as part of the same wireless network, but each Wi-Fi access point (e.g., 110) will have unique identifying information including, for example, a unique BSSID. Moreover, dual or multi-band Wi-Fi access points (e.g., 110) that broadcast on multiple frequency bands, may have a unique BSSID for each frequency band that they broadcast on. Manufacturers are typically assigned blocks of BSSIDs from the governing authority that the manufacturer is allowed to use for the equipment they produce. As such, the BSSID of each and every Wi-Fi access point, or band thereof, should truly be unique and distinguishable from all others.

In the example depicted in the figure, a wireless device 150 such as, for example, a smartphone, may be located, even if only temporarily passing through, within the broadcast range of Wi-Fi access points 110a, 110b, and 110c. Each Wi-Fi access point 110a, 110b, and 110c may periodically broadcast their respective beacon frames 220a, 220b, and 220c announcing the presence of their respective Wi-Fi wireless networks. Wireless device 150 may listen to, and receive, beacon frames 220a, 220b, and 220c from the in-range Wi-Fi access points 110a, 110b, and 110c. In conventional applications, a user of wireless device 150 wishing to join a Wi-Fi wireless network may optionally select the SSID, sometimes referred to as the network name, of the wireless network that they wish to join through the operating system of their device. Sometimes, the wireless device 150 may automatically connect to a previously joined Wi-Fi wireless network automatically based on a user preference. Once connectivity is established, wireless device 150 may communicate 290 with Wi-Fi access point 110a, exchanging data and potentially accessing other networks such as, for example, an upstream Internet connection (e.g., 105 of FIG. 1) through the Wi-Fi access point 110a. It is important to note that, passive scanning 200 is completely anonymous with respect to wireless devices (e.g., 150) that receive beacon frames (e.g., 220a, 220b, and 220c) of in-range Wi-Fi access points (e.g., 110a, 110b, and 110c) until such time that they choose to authenticate to, and associate with, a particular Wi-Fi access point (e.g., 110a). Unless and until a user of a wireless device 150 selects a specific Wi-Fi access point (e.g., 110) and Wi-Fi wireless network thereof to authenticate to, associate with, and establish data connectivity with, wireless device 150 may passively receive the Wi-Fi signals being publicly broadcast by Wi-Fi access points 110a, 110b, and 110c and any others that it may encounter while remaining completely anonymous. However, wireless devices 150 record information relating to the Wi-Fi access points (e.g., 110) they encounter, even if they never formally join the network, typically without awareness on the part of the user, as discussed in more detail herein.

Figure 2B:
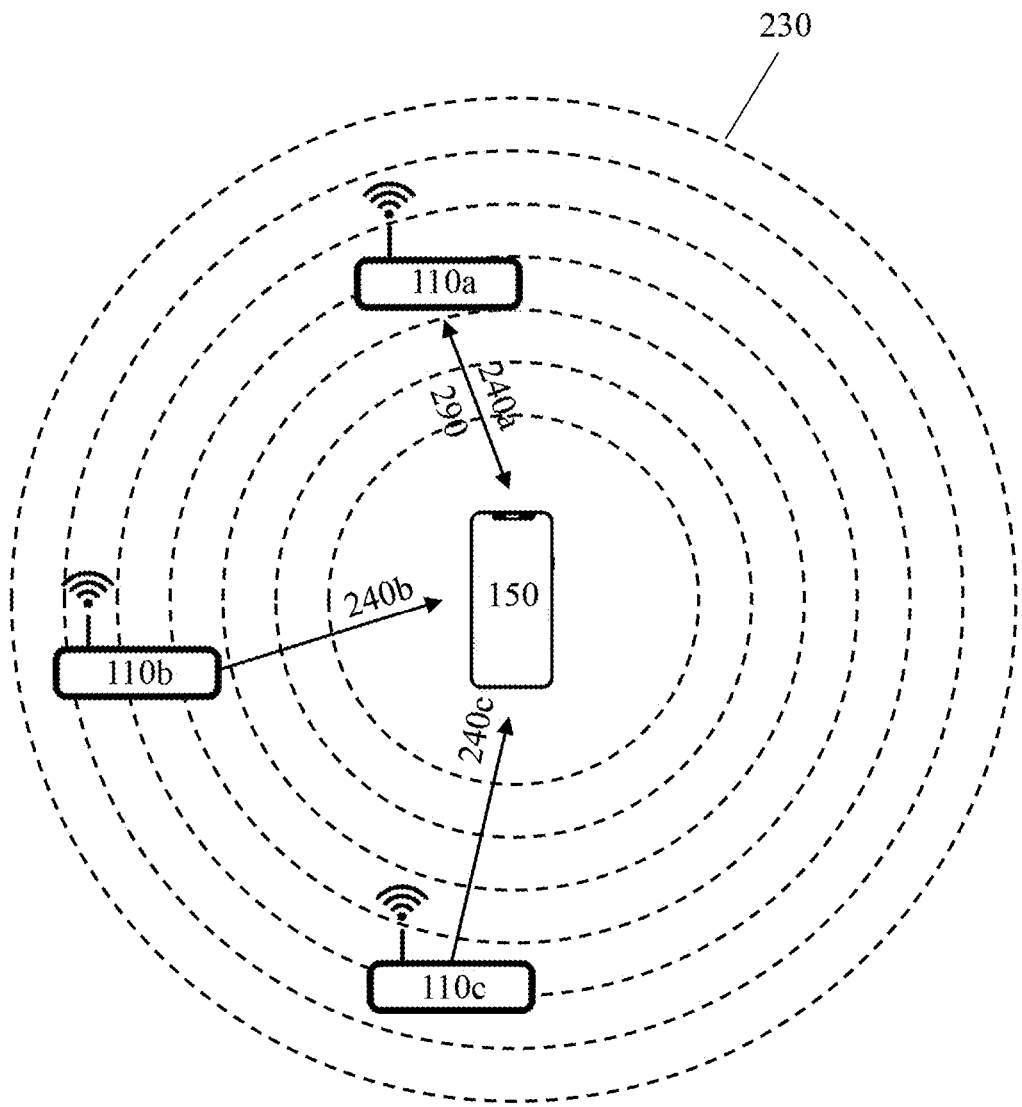
FIG. 2B shows an active scanning mode as part of IEEE 802.11 Wi-Fi wireless network discovery process.

FIG. 2B shows active scanning mode 205 as part of IEEE 802.11 Wi-Fi wireless network discovery. In contrast to passive scanning mode (e.g., 200 of FIG. 2A), active scanning mode 205 is a type of Wi-Fi wireless network discovery process where a wireless device 150 broadcasts a probe request frame 230 to a specific (e.g., 110a) or all Wi-Fi access points (e.g., 110a, 110b, and 110c) that are within Wi-Fi signaling range. A probe request frame 230 is a type of Wi-Fi management frame that may include information about the specific Wi-Fi access point (e.g., 110a) that the wireless device 150 wishes to associate with, sometimes referred to as a directed probe request, or may be a probe for all available Wi-Fi access points (e.g., 110a, 110b, 110c) within Wi-Fi signaling range, sometimes referred to as a null probe request. Responding in-range Wi-Fi access points 110a, 110b, and 110c transmit a probe response frame 240a, 240b, and 240c that includes information substantially similar to a beacon frame (e.g., 220 of FIG. 2A) including their respective SSID and unique BSSID.

In contrast to passive scanning (e.g., 200 of FIG. 2A) where each Wi-Fi access point (e.g., 110) broadcasts its respective beacon frames (e.g., 220 of FIG. 2A) on a specific channel, in active scanning mode 205, wireless device 150 may broadcast probe request frames 230 across all available channels for the associated frequency band. In this way, wireless device 150 may, for example, select a Wi-Fi access point (e.g., 110a) that provides the strongest received signal strength and quality for the time being. However, even when a particular wireless device 150 is authenticated to, and associated with, a specific Wi-Fi access point (e.g., 110a), wireless device 150 may go off channel and continue to send probe request frames (e.g., 230) on other channels. By continuing to actively probe for Wi-Fi access points (e.g., 110), wireless device 150 may maintain a list of known Wi-Fi access points (e.g., 110) that may facilitate roaming should the wireless device 150 move out of range of the currently associated Wi-Fi access point (e.g., 110a) or require a better connection. In contrast to passive scanning mode (e.g., 200 of FIG. 2A), active scanning mode 205 only requires a wireless device 150 to send a probe request frame 230 on a specific channel within the designated frequency band and then listen for a comparatively smaller amount of time as compared to passive scanning (e.g., 200 of FIG. 2). As such, active scanning 205 presents a more direct and targeted approach to Wi-Fi wireless network discovery process as compared to the broadcast nature of passive scanning operations (e.g., 200 of FIG. 2A).

Figure 2C:
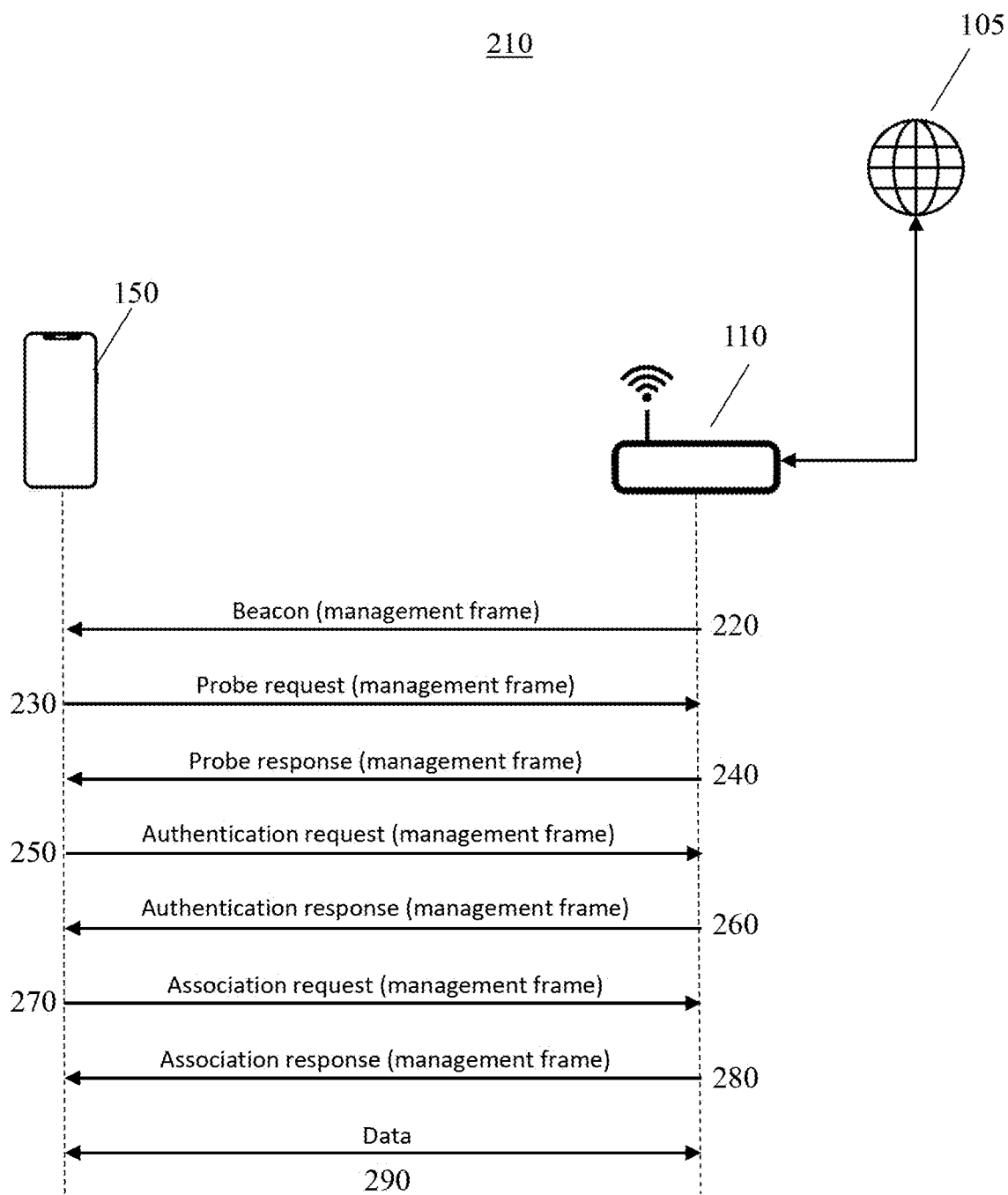
FIG. 2C shows a sequence of IEEE 802.11 management frames typically exchanged between a wireless device and a Wi-Fi access point as part of Wi-Fi wireless network discovery process.

FIG. 2C shows a sequence of IEEE 802.11 management frames 210 typically exchanged between a wireless device 150 and a Wi-Fi access point 110 as part of Wi-Fi wireless network discovery process. A wireless device 150 must successfully identify (e.g., 220, 230, and 240), authenticate to (e.g., 250 and 260), and associate with (e.g., 270 and 280) a Wi-Fi access point 110 in order to transmit data frames 290 containing data under the protocol. As previously discussed, Wi-Fi wireless network discovery refers to the process by which a wireless device 150 typically identifies, authenticates to, and associates with an in-range Wi-Fi access point 110 to enable data transfer with other devices and an upstream network connection, such as, for example, the Internet 105.

The IEEE 802.11 standard specifies three different types of frames: management frames, data frames, and control frames, each of which serves a specific purpose under the protocol. For example, management frames are used for supervisory functions including Wi-Fi wireless network discovery, data frames are used to transmit data once authenticated and associated, and control frames are used to control the transmission of data. As noted above, the IEEE 802.11 standard specifies two different scenarios by which a wireless device 150 may identify, authenticate to, and associate with a Wi-Fi access point 110 as part of the Wi-Fi wireless network discovery process.

In passive scanning mode, a wireless device 150 listens for beacon frames 220, a type of management frame, that is broadcast at periodic intervals by in-range Wi-Fi access points 110. The beacon frame 220 announces the presence of the Wi-Fi access point 110 and includes information that facilitates potential authentication to, association with, and ultimately data transmission. The information includes, for example, the BSSID and the SSID of the broadcasting Wi-Fi access point 110. For example, the user of a wireless device 150, in this example a smartphone, may open the Wi-Fi application on their device, see a list of SSIDs corresponding to in-range Wi-Fi access points 110 that are broadcasting their respective beacon frames (e.g., 220), and select a particular SSID of the Wi-Fi wireless network they wish to join. When the user selects the SSID of a particular Wi-Fi access point 110, the wireless device 150 transmits a probe request frame 230, another type of management frame, to the particular Wi-Fi access point 110 that includes the capabilities of the wireless device 150. In the active scanning mode, without necessarily having received a beacon frame 220, the wireless device 150 may transmit a probe request frame 230 that includes the capabilities of the wireless device 150 to a specific Wi-Fi access point 110 or all Wi-Fi access points 110 in range. As such, the Wi-Fi wireless network discovery process may be initiated by a Wi-Fi access point 110 that broadcasts beacon frames 220 or a wireless device 150 that transmits a probe request frame 230. Regardless of which, the remainder of the authentication and association protocol is substantially the same.

Subsequent to receipt of the probe request frame 230, if the Wi-Fi access point 110 has compatible parameters, the Wi-Fi access point 110 transmits a probe response frame 240, another type of management frame, to the wireless device 150. The probe response frame 240 includes the parameters typically included in the beacon frame 220 including unique identifying information and capabilities of the Wi-Fi access point 110. It is important to note that, at this stage of the process, the wireless device 150 is unauthenticated to, and unassociated with, the Wi-Fi access point 110, and is not capable of transmitting data in data frames 290. Subsequent to receipt of the probe response frame 240, the wireless device 150 transmits an authentication request frame 250, another type of management frame, to the Wi-Fi access point 110. The authentication protocol establishes whether the wireless device 150 is authenticated to the Wi-Fi access point 110, i.e., ensuring permission or access with respect to encryption (open or shared key encryption). Without discussing the details of the authentication protocol, which is unnecessary for the purpose of describing the claimed invention, it is important to note that a wireless device 150 typically cannot proceed to association and data transfer until it is has been successfully authenticated to the Wi-Fi access point 110, as signified by an authentication response frame 260, another type of management frame, acknowledging successful authentication.

Once authenticated to Wi-Fi access point 110, wireless device 150 transmits an association request frame 270, another type of management frame, to Wi-Fi access point 110. The association request frame 270 signifies a request by the authenticated, but as yet unassociated wireless device 150 to associate with the Wi-Fi access point 110 and enable data transfer via data frames 290. The association request 270 includes information including, for example, capabilities of the wireless device 150. After receipt of the association request 270, the Wi-Fi access point 110 compares the capabilities set out in the association request 270 with the capabilities of the Wi-Fi access point 110 to determine if they match. If there is a mismatch, the Wi-Fi access point 110 determines whether the differences are an issue that prevents association and data transfer. If the differences are not substantive, the Wi-Fi access point 110 transmits an association response 280, another type of management frame, acknowledging successful association. Once the association response 280, signifying successful association with Wi-Fi access point 110, is received, wireless device 150 may exchange data 290 with Wi-Fi access point 110 in data frames that are routed over a bridged network connection, typically the Internet 105, to its final destination. It is important to note that, in order for a wireless device 150 to transmit data with Wi-Fi access point 110, other than management frames, the wireless device 150 must authenticate to, and associate with, Wi-Fi access point 110, thereby enabling wireless device 150 to transmit and receive data 290. And similarly, Wi-Fi access point 110 cannot transfer data in data frames to wireless device 150 until wireless device 150 has authenticated to, and associated with, Wi-Fi access point 110.

FIG. 3A shows the subtypes of IEEE 802.11 management frames. In a conventional management frame (e.g., 1100 of FIG. 11), the first octet is defined as the Frame Control field (e.g., 1110 of FIG. 11). The first three subfields of the Frame Control field (e.g., 1110 of FIG. 11) are present in all IEEE 802.11 frames and include the protocol version (not shown), the type of frame, and the subtype of frame. The type of frame subfield indicates whether the frame is a management frame, data frame, or control frame. The subtype of frame subfield indicates the particular subtype of frame within the type. In the figure, the various subtypes of management frames are shown. The subtype bits 310 represent the binary encoded subtype described by the subtype description 320. For purposes of the discussion that follows, emphasis will be placed on the beacon frame and probe response frame subtypes of management frames. Notwithstanding, as can be seen by the enumerated list of management frames, other management frames used for supervisory purposes relating to identification, authentication, and association by Wi-Fi wireless devices (e.g., 150) may be used in accordance with one or more embodiments of the present invention.

Figure 3B:
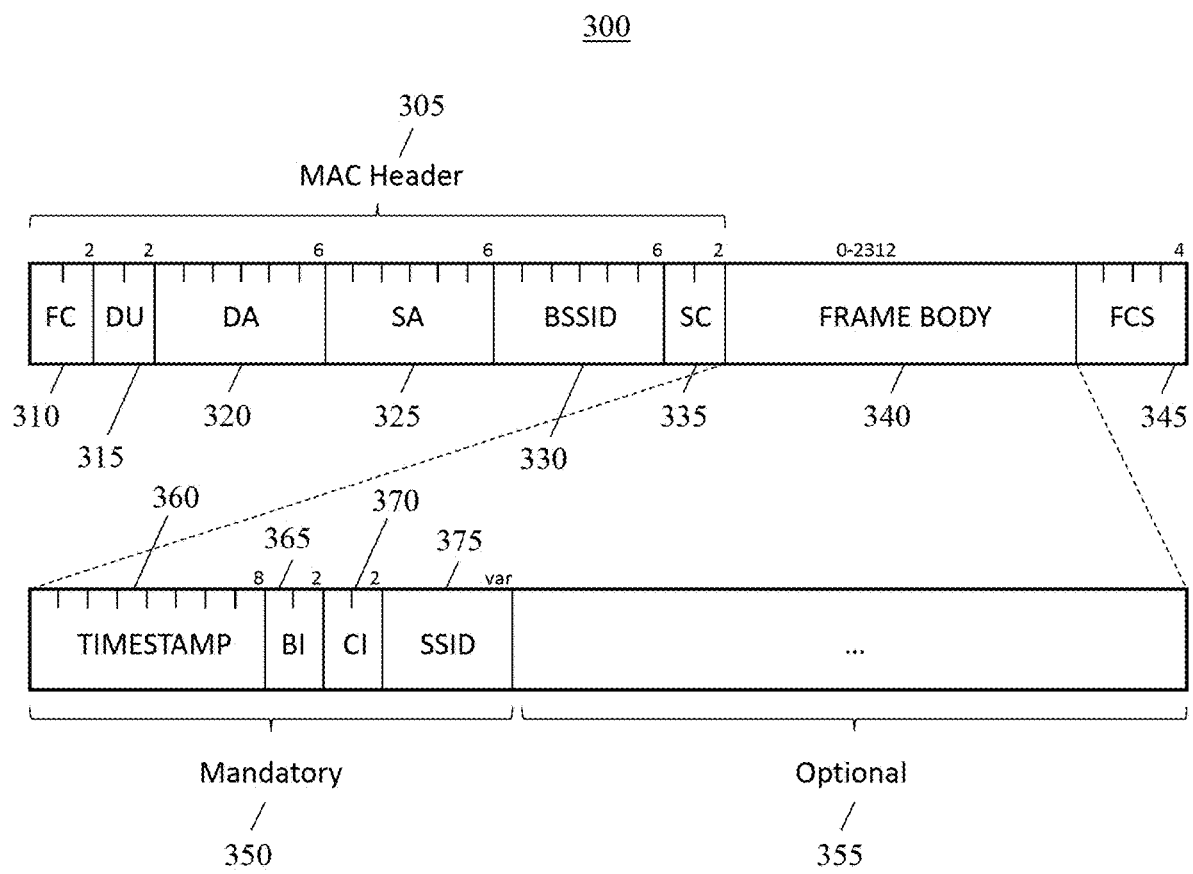
FIG. 3B shows the structure of a conventional IEEE 802.11 management frame representative of the type of management frames transferred between a wireless device and a Wi-Fi access point.

FIG. 3B shows the structure of a conventional IEEE 802.11 management frame 300 representative of the type of management frames transferred between a wireless device (e.g., 150) and a Wi-Fi access point (e.g., 110). The conventional management frame 300 includes a number of predetermined fields that are defined by the specification for their protocol-defined purpose. For example, MAC header 305 of management frame 300, includes Frame Control field 310, Duration field 315, Destination Address field 320, Source Address field 325, BSSID 330, and Sequence Control field 335. Management frame 300 further includes the Frame Body field 340 that includes a number of subfields, including some that may vary based on the subtype (e.g., 310 of FIG. 3A) of management frame 340. For example, Frame Body 340 includes mandatory subfields 350 including Timestamp subfield 360, Beacon Interval subfield 365, Compatibility Information subfield 370, SSID subfield 375, and potentially Supported Rates subfield (not shown). Frame Body field 340 may also include one or more optional subfields 355 that also may vary based on the subtype (e.g., 310 of FIG. 3A) of management frame 340. The end of management frame 300 includes a Frame Check Sequence field 345 that includes an error-detecting code. During Wi-Fi wireless network discovery, beacon frames, probe response frames, and other management frames are in the form of conventional management frame 300, for the purpose of furthering identification, authentication to, and association with, a Wi-Fi access point (e.g., 110).

Figure 4A:
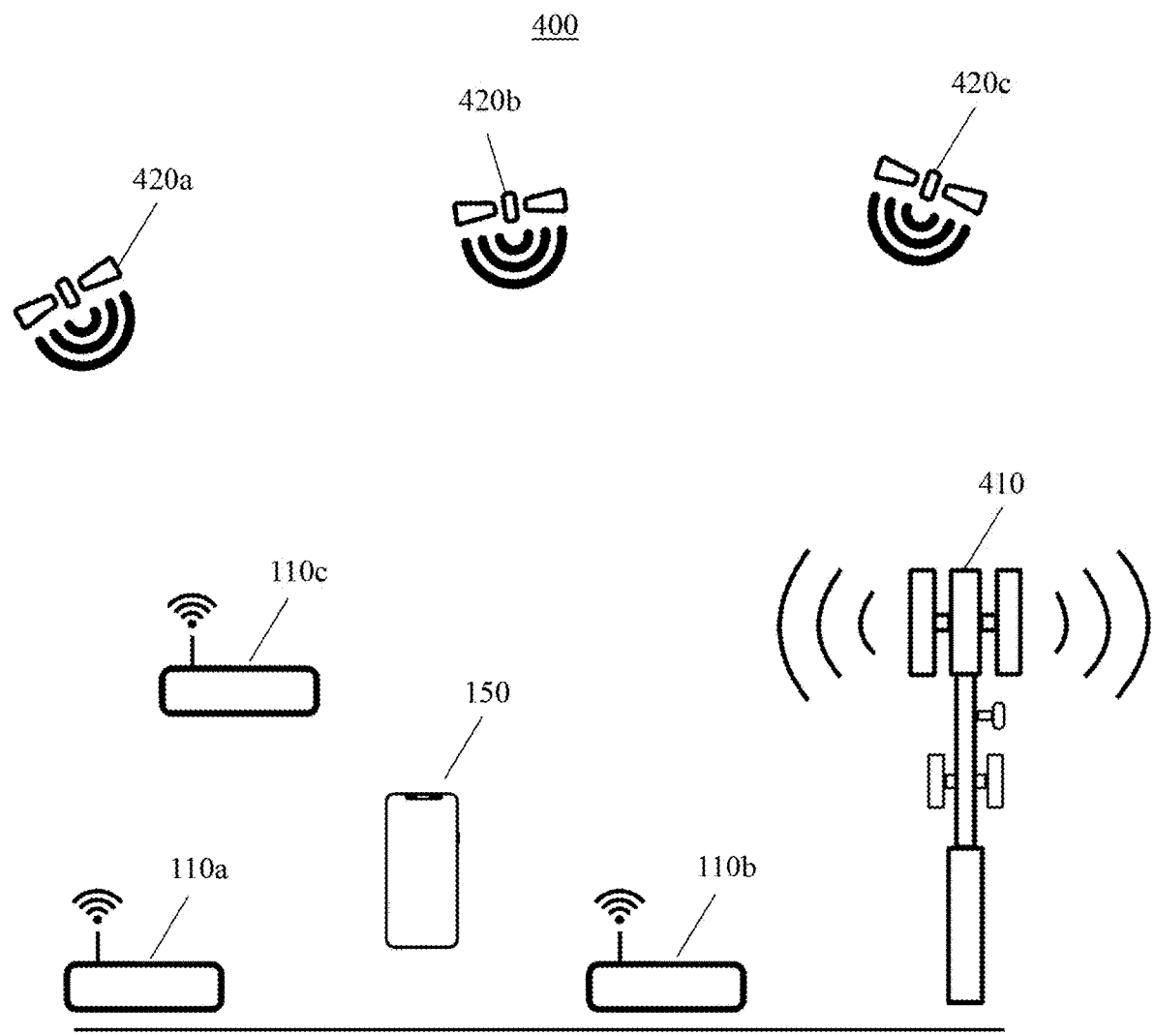
FIG. 4A shows various technologies that may be used to determine a location of a wireless device and one or more Wi-Fi access points.

FIG. 4A shows various technologies that may be used to determine a location of a wireless device 150 and one or more Wi-Fi access points (e.g., 110). Wireless device 150, which may be a smartphone as depicted in the example or any other type or kind of wireless device, may establish a cellular connection with one or more cell towers 410 providing cellular network connectivity if it possesses cellular capabilities. An established connection to a particular cell tower 410 may, in some circumstances, be used to establish a location of wireless device 150 within a determinable radius of the particular cellular tower 410. Further, patterns of connectivity to one or more cell towers 410 may be used to establish a location or potentially even the movement of wireless device 150 within a determinable radius. However, these techniques are rarely used outside of law enforcement. Instead, wireless devices 150 typically rely on GPS signals to determine their own location. Most wireless devices 150 include a GPS receiver (not independently shown) capable of receiving one or more GPS signals (not shown) from one or more GPS satellites (e.g., 420a, 420b, and 420c) in Earth orbit. Typically, there are at least four GPS satellites (e.g., 420) visible overhead to a wireless device 150 no matter where it is located, anywhere around the globe. Each GPS satellite 420a, 420b, and 420c transmits a GPS signal (not shown) that includes information about the satellite's current position and the current time at regular intervals. The GPS receiver of wireless device 150 receives one or more of these GPS signals and calculates how far away it is from each satellite based in part on how long it took for each respective GPS signal to arrive. If the wireless device 150 receives the GPS signal from at least three GPS satellites 420a, 420b, and 420c, the location of the wireless device 150 may be determined with a high degree of accuracy by the process referred to as trilateration. The GPS-derived location of wireless device 150 may be determined continuously, periodically, or upon the execution of software that requires location services, such as, for example, navigation software or a web browser used to search nearby places. The accuracy of GPS is within a radius of approximately 16 feet under open skies and good conditions but worsens near structures and obstructions.

In some cases, a wireless device 150 may use one or more in-range Wi-Fi access points 110a, 110b, and/or 110c to improve the accuracy of the GPS location determination and, in instances when GPS is not available, determine its location based on Wi-Fi alone. As part of the Wi-Fi wireless network discovery process, wireless device 150 typically determines the received signal strength, sometimes referred to as Received Signal Strength Indication ("RSSI"), of the Wi-Fi signals broadcast by the in-range Wi-Fi access points 110a, 110b, and/or 110c. Assuming, for the purpose of this discussion, that the location of one or more Wi-Fi access points 110a, 110b, and/or 110c are already known to a certain degree of accuracy, the identified Wi-Fi access points and received signal strengths may be used to refine the accuracy of the GPS location determination and, in instances when GPS is not available, determine the location of the wireless device 150 based on Wi-Fi positioning alone. For example, the known location of a Wi-Fi access point 110a and the received signal strength of the Wi-Fi signal received from it may be used alone or in combination with the known location or received signal strength of other Wi-Fi access points 110b and 110c to refine or determine the location of wireless device 150 by one or more processes such as, for example, RSSI, fingerprinting, angle of arrival, time of flight, or other positioning techniques including trilateration and triangulation. It is important to note that the received signal strength of the Wi-Fi signals received by wireless device 150 from one or more Wi-Fi access points (e.g., 110a, 110b, and/or 110c) are determined without requiring wireless device 150 to authenticate to, associate with, or otherwise establish connectivity with any particular Wi-Fi access point (e.g., 110a, 110b, or 110c). As such, wireless device 150 may receive publicly broadcast Wi-Fi signals of in-range Wi-Fi access points (e.g., 110a, 110b, or 110c) that it does not use or otherwise associate with in any way.

Figure 4B:
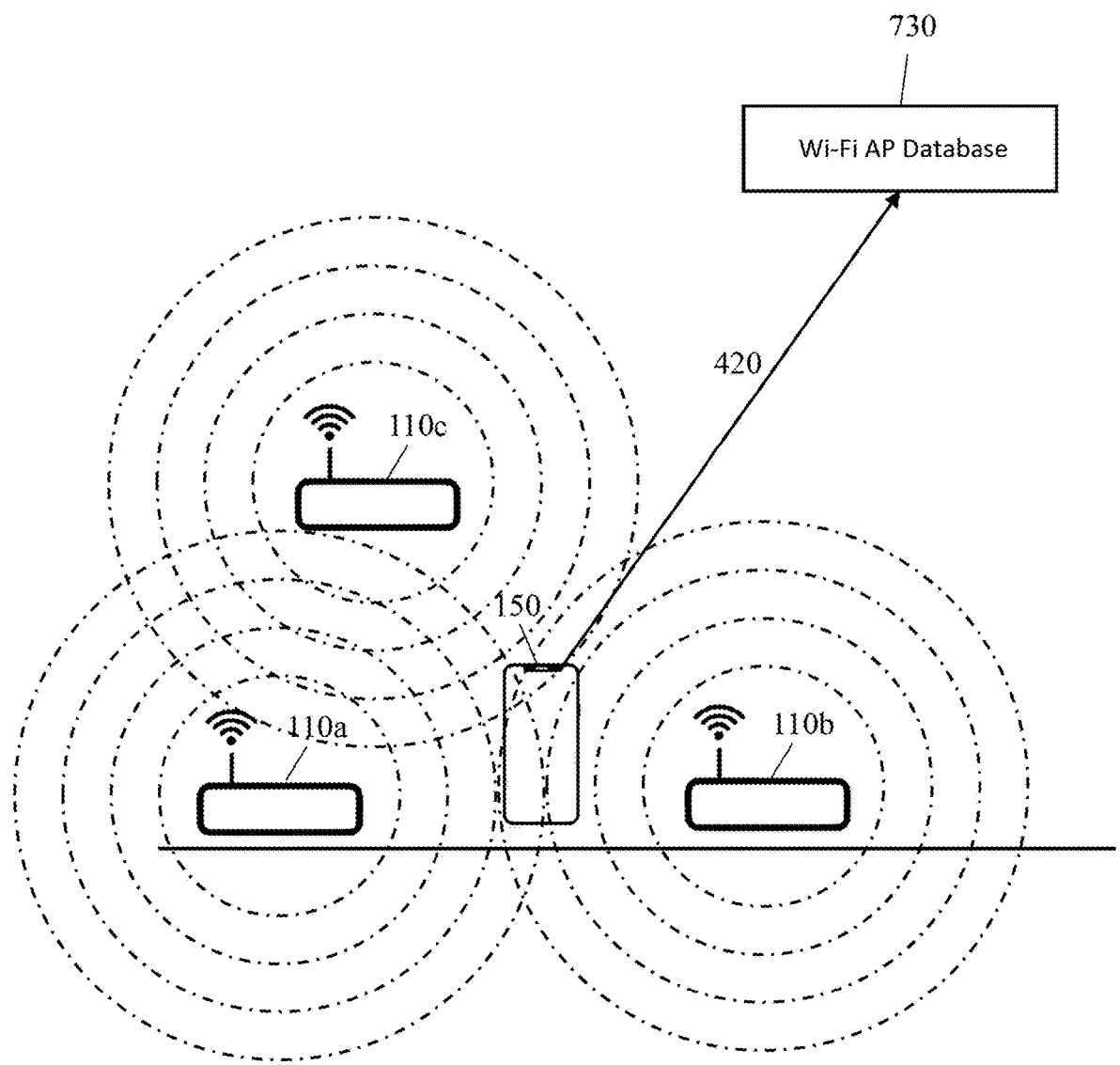
FIG. 4B shows an overview of a wireless device reporting observations of one or more encountered Wi-Fi access points to a Wi-Fi AP Database.

Continuing, FIG. 4B shows an overview of a wireless device 150 reporting observations of encountered Wi-Fi access points 110a, 110b, and 110c to a Wi-Fi AP Database 730. In the discussion of FIG. 4A, an assumption was made that the location of one or more Wi-Fi access points (e.g., 110a, 110b, and 110c) were known to a certain degree of accuracy. This assumption holds true because wireless devices (e.g., 150) report in-range Wi-Fi access points (e.g., 110) they encounter as well as location information to the original equipment manufacturer, operating system developer, and/or third-party software developer who maintain a database, referred to herein as a Wi-Fi AP Database 730, of observations of Wi-Fi access points (e.g., 110a, 110b, and 110c). The Wi-Fi AP Database 730 stores reported observations 420 of Wi-Fi access points (e.g., 110a, 110b, and 110c) that are conventionally used to enhance location services (i.e., significant locations, location-based suggestions, location-based alerts, popular near me, and the like) of end users. While this benefits the user of the wireless device 150 in providing improved services, each wireless device (e.g., 150) reports information relating to the location of Wi-Fi access points (e.g., 110) it encounters on an ongoing and continuous basis, typically without awareness on the part of the user. For example, this is commonly performed in the background as part of, for example, Apple® iOS®, Google® Android®, or Microsoft® location-based services and it is typically made available to third-party software developers for commercial use. In addition, many third-party software companies maintain their own Wi-Fi AP Database 730 of observation data including the unique identifying information and location information of Wi-Fi access points (e.g., 110), some of which commercially offer access to their database for a fee. For example, Cisco Systems®, Facebook®, WhatsApp®, X-Mode®, Ruckus®, and Skyhook® offer commercial versions of a Wi-Fi AP Database 730. It is important to note that the information stored in such databases is typically obtained anonymously through publicly accessible Wi-Fi access point (e.g., 110) signals and in accordance with the terms and conditions of use of most smartphones, that typically provide the user with the option of opting-out of participation in such services. Further, the reports of observation data are typically anonymous, and no record of the reporting wireless device 150 is maintained. Thus, every user of a wireless device 150, such as a smartphone, reports observation data of Wi-Fi access points (e.g., 110) they encounter to a Wi-Fi AP Database 730 on an ongoing and continuous basis, often without an awareness on the part of the user they are doing so, however, the user benefits from the enhanced location determination when browsing the web for nearby offerings or other location services.

Figure 5:
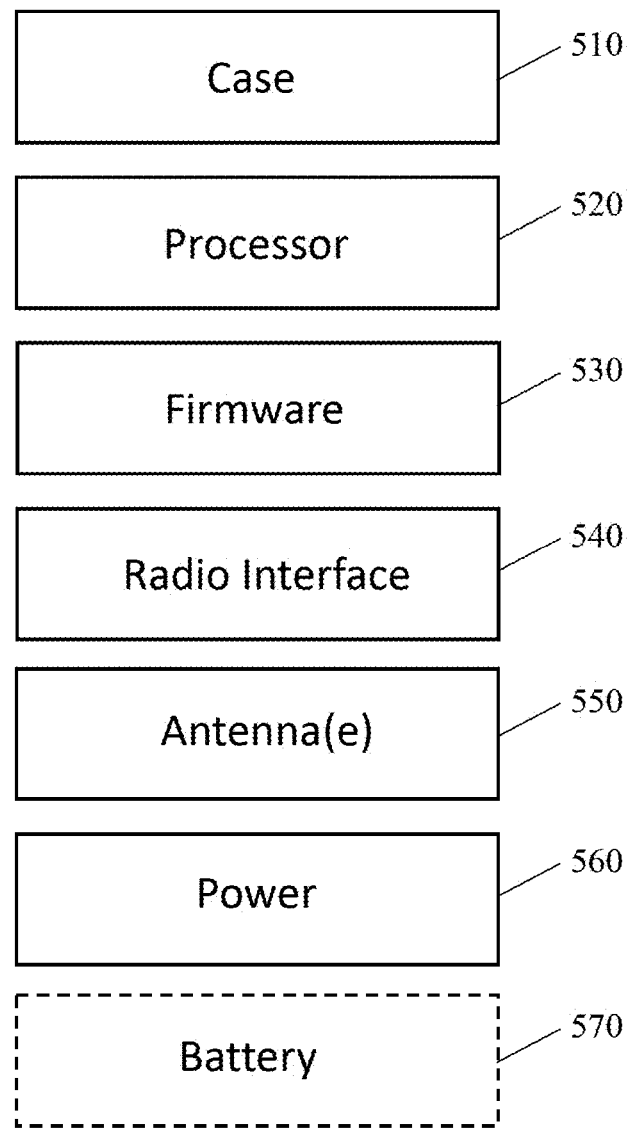
FIG. 5 shows a block diagram of a conventional Wi-Fi access point.

While well-known in the art, FIG. 5 shows a block diagram of a conventional Wi-Fi access point 110. A conventional Wi-Fi access point 110 typically includes a printed circuit board and related components (not shown) that are typically disposed within a casing or enclosure 510. Wi-Fi access point 110 typically includes a processor 520 that serves as the primary computational and processing engine of the system, firmware 530 that includes the software instructions that are executed by the processor 520 and govern the functionality of the system, a radio interface 540 that transmits and receives information via one or more antennae 550, and a power source 560. In conventional applications, power source 560 is typically a DC power source, however, some industrial and commercial applications may be configured for use with AC power, and still other applications may be configured for use with optional battery-power 570. Wi-Fi access point 110 may include integrated router capabilities (not independently illustrated).

In certain embodiments of the claimed invention, a Wi-Fi access point 110 may not include one or more features to reduce the size, complexity, and power consumption of the device. For example, if the Wi-Fi access point 110 is used strictly for the asset tracking task, the router and bridge functionality may not be required and may by removed. In other embodiments of the claimed invention, a dummy Wi-Fi access point 110 may used that is not required to function as an access point, but merely spoof, or emulate, the Wi-Fi wireless network discovery protocol, or parts thereof, transmitting beacon frames, probe response frames, and/or other management frames as if it were a fully functional Wi-Fi access point 110. Notwithstanding, one of ordinary skill in the art will recognize that any Wi-Fi access point 110, variant thereof, or other device capable of participating in at least part of the Wi-Fi wireless network discovery protocol as if it were a bona fide Wi-Fi access point 110 may be used in accordance with one or more embodiments of the present invention.

Figure 6:
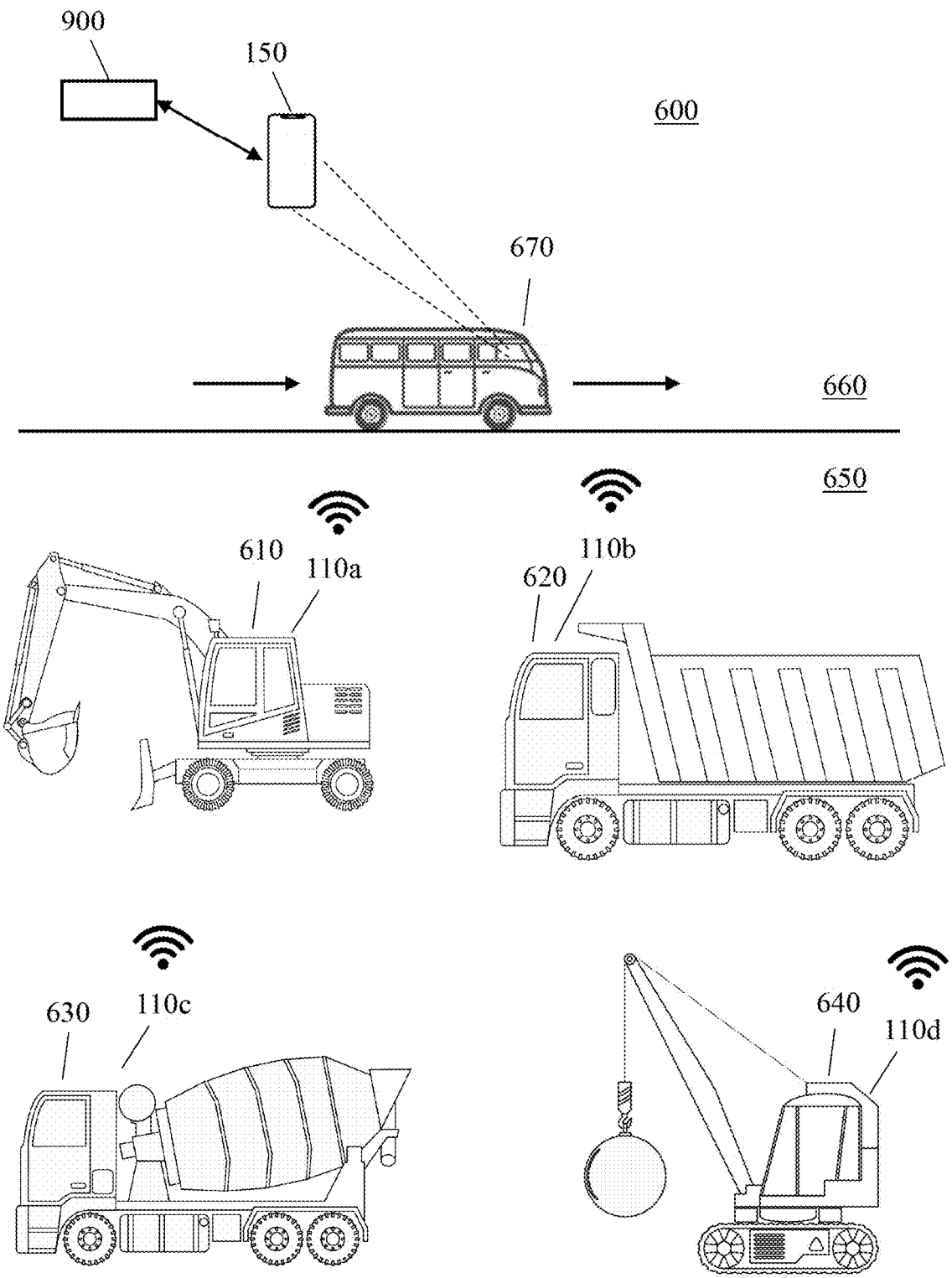
FIG. 6 shows an example of an application of passive asset tracking using observations of Wi-Fi access points in accordance with one or more embodiments of the present invention.

FIG. 6 shows an example of an application of passive asset tracking 600 in accordance with one or more embodiments of the present invention. Specifically, in one or more embodiments of the present invention, one or more moveable assets 610, 620, 630, and 640 may be passively tracked by one or more wireless devices 150 that are in-range, or even come in and go out of range, of moveable assets 610, 620, 630, and 640 that broadcast Wi-Fi signals even though a wireless device 150, or user thereof, may not even know that they are participating in the asset tracking task. For example, in the example depicted in the figure, wireless device 150 may be a smartphone carried on a user's person while in a motor vehicle 670 driving down a street 660. The user's smartphone 150 may, without requiring awareness on the part of the user, report observations of the in-range, even if only temporarily, Wi-Fi access points 110a, 110b, 110c, and 110d encountered to an asset tracking database (e.g., 710 of FIG. 7A) and/or a Wi-Fi AP Database (e.g., 730 of FIG. 7A). The asset tracking database (e.g., 710 of FIG. 7A) may use one or more observations to determine a location of a moveable asset 610, 620, 630, or 640. Advantageously, the moveable assets (and associated Wi-Fi access points) do not require any network connectivity, may be deployed anywhere in the world, and the existing installation of users of smartphones 150 may be used to passively track the locations of the moveable assets 610, 620, 630, and 640.

As such, for the purpose of this disclosure, passive asset tracking means tracking an asset (e.g., 610) based on observations of Wi-Fi access points (e.g., 110) without requiring any particular wireless device 150 to authenticate to, associate with, or establish connectivity with any particular Wi-Fi access point (e.g., 110a or any other). Moreover passive asset tracking does not require a Wi-Fi access point (e.g., 110) associated with an asset (e.g., 610) to provide any network connectivity. In certain embodiments of the present invention, one or more wireless devices 150 may report observation data of an encounter with a Wi-Fi access point (e.g., 110a, 110b, 110c, or 110d) associated with an asset (e.g., 610, 620, 630, or 640) to a Wi-Fi AP Database (e.g., 730 of FIG. 7A). An asset tracking database (e.g., 710 of FIG. 7A) may receive observation data from the Wi-Fi AP Database (e.g., 730 of FIG. 7A) comprising location information to determine a location of one or more moveable assets (e.g., 610, 620, 630, or 640). In other embodiments of the present invention, one or more direct reporting wireless devices 150 may report first observation data of an encounter with a Wi-Fi access point (e.g., 110a, 110b, 110c, or 110d) associated with a moveable asset (e.g., 610, 620, 630, or 640) to the asset tracking database (e.g., 710 of FIG. 7A) and one or more indirect reporting wireless devices (e.g., 150) may report second observation data from a Wi-Fi AP Database (e.g., 730 of FIG. 7A). The Wi-Fi AP Database (e.g., 730 of FIG. 7A) may receive second observation data from one or more indirect reporting wireless devices (e.g., 150) that encounter one or more Wi-Fi access points (e.g., 110a, 110b, 110c, or 110d) associated with one or more assets (e.g., 610, 620, 630, or 640). In still other embodiments, one or more wireless devices 150 may report observation data of an encounter with a Wi-Fi access point (e.g., 110a, 110b, 110c, or 110d) associated with an asset (e.g., 610, 620, 630, or 640) to the asset tracking database (e.g., 710 of FIG. 7A). In all such embodiments, the Wi-Fi wireless network discovery process, as well as the reporting of observations of Wi-Fi access points (e.g., 110) encountered, may be advantageously used to passively track one or more assets (e.g., 610, 620, 630, or 640) without requiring that any wireless device 150 authenticate to, associate with, or join any particular Wi-Fi access point (e.g., 110), using publicly accessible Wi-Fi signals, and in passive scanning applications, anonymously with respect to the asset tracking task. In addition, one or more Wi-Fi access points (e.g., 110a, 110b, 110c, or 110d) associated with one or more assets (e.g., 610, 620, 630, or 640) are not required to provide any network connectivity.

Returning to the example depicted in the figure, one or more Wi-Fi access points 110a, 110b, 110c, and 110d may be disposed on, attached to, or integrated with one or more assets 610, 620, 630, and 640 that may be deployed in the field 650. For the purpose of illustration, capital construction equipment 610, 620, 630, and 640 is shown as examples of moveable assets that could be tracked. However, one of ordinary skill in the art will recognize that any moveable asset may be tracked in accordance with one or more embodiments of the present invention.

It is important to recognize that the Wi-Fi access points 110a, 110b, 110c, and 110d are not required to participate in any particular wireless network or provide any network connectivity. Advantageously, the Wi-Fi access points 110a, 110b, 110c, and 110d are only be required to participate in a portion of the Wi-Fi wireless network discovery process as part of the asset tracking task. Specifically, each Wi-Fi access point 110a, 110b, 110c, and 110d disposed on, attached to, or integrated with an asset 610, 620, 630, and 640 may broadcast beacon frames (e.g., 220 of FIG. 2C) in passive scanning mode (e.g., 200 of FIG. 2A) and/or respond to probe request frames (e.g., 240 of FIG. 2C) as part of active scanning mode (e.g., 205 of FIG. 2B), where either the beacon frames (e.g., 220 of FIG. 2C) or probe response frames (e.g., 240 of FIG. 2C) include information that uniquely identifies the Wi-Fi access point (e.g., 110b), and by proxy, a particular asset (e.g., 620) itself. It is important to recognize that each moveable asset (e.g., 610, 620, 630, and 640) to be tracked is not required to have any communications capabilities of any kind whatsoever other than the ability to participate in, at least part of, the Wi-Fi wireless network discovery process. One of ordinary skill in the art will recognize that the beacon frame (e.g., 220 of FIG. 2C), probe response frame (e.g., 230 of FIG. 2C), or other management frame (e.g., 300 of FIG. 3A) may contain other information that may be used as part of the asset tracking task in one or more embodiments of the present invention.

Figure 7A:
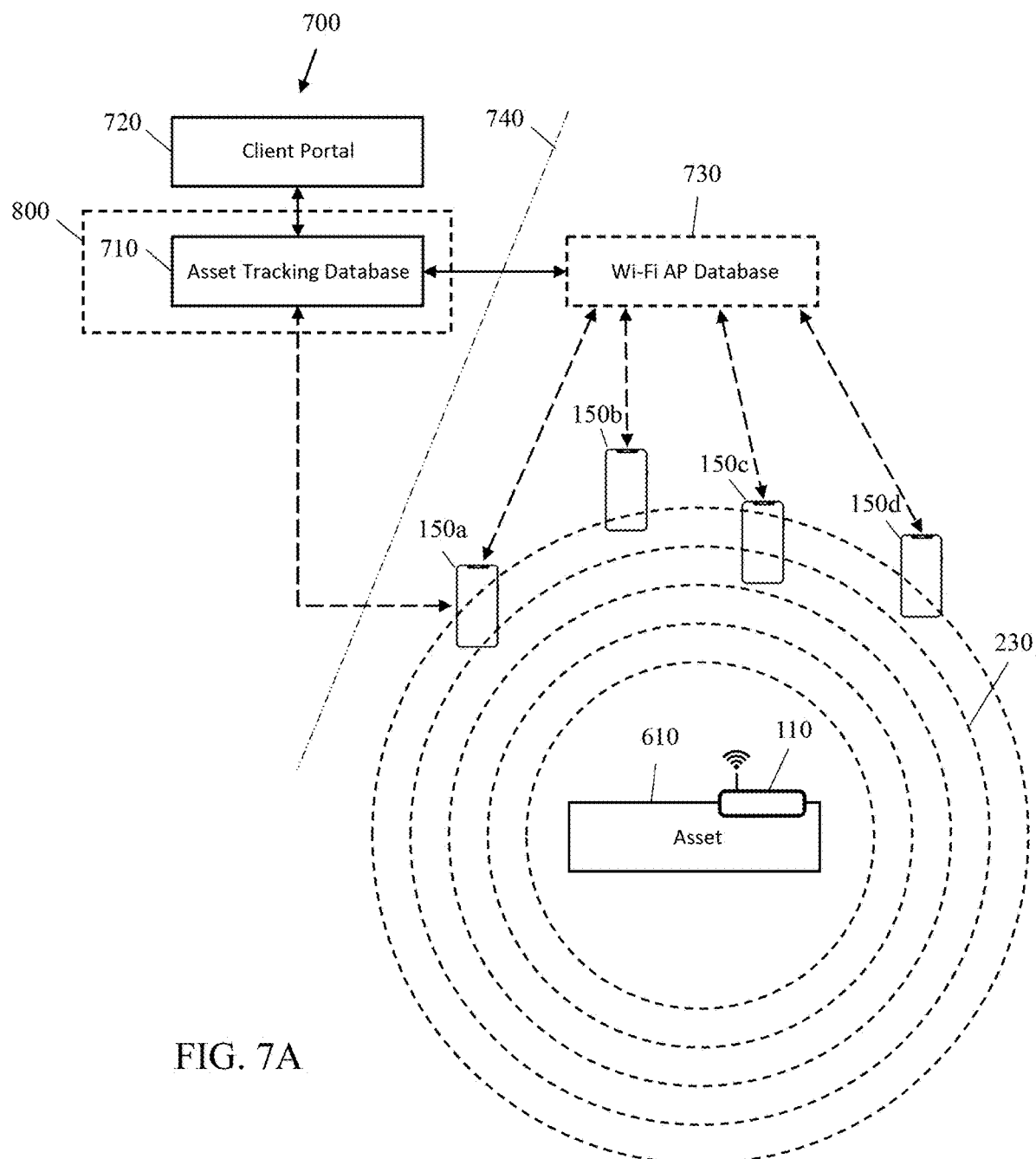
FIG. 7A shows a system for passive asset tracking using observations of Wi-Fi access points in accordance with one or more embodiments of the present invention.

In certain embodiments, in passive scanning mode (e.g., 200 of FIG. 2A), the Wi-Fi access points 110a, 110b, 110c, and 110d may be physically and logically associated with assets 610, 620, 630, and 640 respectively and broadcast beacon frames (e.g., 220 of FIG. 2C) at regular intervals, each of which includes information that uniquely identifies the particular Wi-Fi access point (e.g., 110c) and, to those who recognize the association, the asset (e.g., 630) logically associated with it in the asset tracking database (e.g., 710 of FIG. 7A). One or more wireless devices 150 may come in-range of one or more Wi-Fi access points 110a, 110b, 110c, and 110d and receive one or more beacon frames (e.g., 220 of FIG. 2C). As previously discussed, wireless devices 150 report, via a cellular or other connection, observation data. Each report of observation data includes, at least, unique identifying information, such as, for example, the BSSID, of a Wi-Fi access point (e.g., 110) encountered and location information of the Wi-Fi access point (e.g., 110) encountered. The location information may include coordinates such as latitude and longitude or other information that may be used to determine a location. In certain embodiments, the observation data for a given Wi-Fi access point (e.g., 110) may include one or more of the time, date, current location, speed, and direction of travel of the reporting wireless device 150 at or near the time of the encounter, and SSID, received signal strength, or other information pertaining to the Wi-Fi access point (e.g., 110) encountered. In addition, observation data may include any of the above-noted information from other in-range Wi-Fi access points (e.g., 110) encountered at or near the same time that the given Wi-Fi access point (e.g., 110) of interest was encountered. The observation data is reported to an original equipment manufacturer of the wireless device 150, an operating system developer of an operating system executing on the wireless device 150, or third-party software developer that maintain a Wi-Fi AP Database (e.g., 730 of FIG. 7A), and/or a dedicated asset tracking database (e.g., 710 of FIG. 7A) of the present invention that is used to track assets.

While the observation reporting aspect of wireless devices 150 is typically used to improve the accuracy of location-based services, here, the observation data provides information that may be used to estimate the location of one or more Wi-Fi access points 110a, 110b, 110c, and 110d at a particular time and date without requiring the purposeful participation of any particular wireless device 150 in any particular Wi-Fi wireless network. As such, this information may be used to determine the location of one or more Wi-Fi access points 110a, 110b, 110c, and 110d and, by proxy, one or more moveable assets 610, 620, 630, and 640 with substantial accuracy, that may be further refined with well-known location refinement techniques typically used by wireless devices 150 in place of, or to enhance, GPS location determination or location-based services.

In other embodiments, in active scanning mode (e.g., 205 of FIG. 2B), one or more wireless devices 150 may transmit a probe request frame (e.g., 230 of FIG. 2C) that is not directed to any particular Wi-Fi access point (e.g., 110), requesting that all Wi-Fi access points 110a, 110b, 110c, and 110d in range announce their presence. In response, in-range Wi-Fi access points 110a, 110b, 110c, and 110d may transmit a probe response frame (e.g., 240 of FIG. 2C) which includes information that uniquely identifies the responding Wi-Fi access point 110a, 110b, 110c, and 110d and, to those who recognize the association, the asset 610, 620, 630, and 640 associated with it. As previously discussed, wireless devices 150 report, via a cellular or other connection, observation data including, at least, unique identifying information, such as, for example, the BSSID, of one or more Wi-Fi access points (e.g., 110) encountered and location information of the one or more Wi-Fi access points (e.g., 110) encountered. The location information may include coordinates such as latitude and longitude or other information that may be used to determine a location. In certain embodiments, the observation data for a given Wi-Fi access point (e.g., 110) may include one or more of the time, date, current location, speed, and direction of travel of the reporting wireless device 150 at or near the time of the encounter, and SSID, received signal strength, or other information pertaining to the Wi-Fi access point (e.g., 110) encountered. In addition, observation data may include any of the above-noted information from other in-range Wi-Fi access points (e.g., 110) encountered at or near the same time that the given Wi-Fi access point (e.g., 110) of interest was encountered. The observation data is reported to an original equipment manufacturer of the wireless device 150, an operating system developer of an operating system executing on the wireless device 150, or third-party software developer that maintain a Wi-Fi AP Database (e.g., 730 of FIG. 7A), and/or a dedicated asset tracking database (e.g., 710 of FIG. 7A) of the present invention that is used to track assets. Mobile operating systems used on smartphones 150 typically include existing infrastructure to report observation data to the operating system developer's Wi-Fi AP Database (e.g., 730 of FIG. 7A) in the background without requiring awareness on the part of the user.

While a single wireless device 150 is depicted in the figure, one of ordinary skill in the art will recognize that any number of wireless devices 150 may come in and out of range of the assets 610, 620, 630, and 640 over time, each of which may independently report observation data of in-range Wi-Fi access points 110a, 110b, 110c, and 110d they encountered (and other information that may be useful to the asset tracking task). In fact, the tracking accuracy may improve as a function of the number of observations that take place over time, or potentially provide additional information such as movement of assets 610, 620, 630, and 640 throughout the day, or the speeds at which they are moving, or even when they leave a boundary of the job site 650.

FIG. 7A shows a system 700 for passive asset tracking using observations of Wi-Fi access points (e.g., 110) in accordance with one or more embodiments of the present invention. The system 700 may include a software application comprising an asset tracking database 710 executing on a computing system 800 and a client portal 720 that provides asset tracking clients (not shown) access to data stored in asset tracking database 710.

In certain embodiments, asset tracking database 710 may be a database software application comprising a backend that performs housekeeping software functions, a database management system ("DBMS") that provides data processing functions, a data store (the literal database) that contains observation and other data, one or more administrative interfaces, and one or more other interfaces to the data contained in database 710. One of ordinary skill in the art will recognize that asset tracking database 710 may include other software, functions, and features, well known in the art, necessary to deploy a database-type application in accordance with one or more embodiments of the present invention. In certain embodiments, client portal 720 may be a web-based portal (not independently illustrated) that provides access to data stored in asset tracking database 710. In other embodiments, client portal 720 may be a standalone software application (not independently illustrated) that provides access to data stored in asset tracking database 710. In still other embodiments, client portal 720 may be an interface integrated with asset tracking database 710 to provide frontend access to asset tracking database 710. One of ordinary skill in the art will recognize that client portal 720 may include other software, functions, and features, well known in the art, necessary to access data contained in a database in accordance with one or more embodiments of the present invention.

At the outset, it is important to recognize that everything depicted to the right of the line of demarcation 740 in the figure (included solely to enhance understanding), with the exception of Wi-Fi access point 110 disposed on, attached to, or integrated with asset 610, represents existing infrastructure representative of the smartphone ecosystem of users and infrastructure. The behavior of the wireless devices 150 that participate in this ecosystem, including their inherent reporting features of Wi-Fi access points (e.g., 110) encountered, may be leveraged to passively tracking assets, potentially without awareness, on the part of the existing infrastructure in accordance with one or more embodiments of the present invention.

In certain embodiments, asset tracking database 710 may obtain observation data indirectly from a third-party Wi-Fi AP Database 730 that receives observations from one or more wireless devices (e.g., 150b, 150c, and 150d), typically based on reports of observation data used to improve the accuracy of location services. In such embodiments, Wi-Fi AP Database 730 may be a database independently established, operated, and maintained separate and apart from asset tracking database 710 by an original equipment manufacturer of a wireless device (e.g., 150), an operating system developer of an operating system executing on a wireless device (e.g., 150), or a third-party software developer. For example, in certain embodiments, Wi-Fi AP Database 730 may be Apple® iOS®, Google® Android®, or Microsoft® location-based services databases typically used to improve location determination accuracy for their respective end users. In other embodiments, Wi-Fi AP Database 730 may be a database of observations including the unique identifying information of Wi-Fi access points (e.g., 110) and information relating to the location of the Wi-Fi access points (e.g., 110) that are commercially offered by third-parties including, for example Cisco Systems®, Facebook®, WhatsApp®, X-Mode®, Ruckus®, and Skyhook®. One or more wireless devices (e.g., 150a) may report observation data to Wi-Fi AP Database 730 for storage in their database and asset tracking database 710 may obtain observation data from Wi-Fi AP Database 730 for use with the asset tracking task, without requiring an awareness on the part of the Wi-Fi AP Database 730, the reporting wireless devices (e.g., 150b, 150c, and 150d), or users thereof, that they are participating in the asset tracking task. The observation data reported to the Wi-Fi AP Database 730 and the observation data obtained by the asset tracking database 710 may or may not be the same, but the observation data obtained by asset tracking database 710 includes at least the unique identifying information and location information of a Wi-Fi access point 110 encountered that is associated with an asset 610.

In other embodiments, asset tracking database 710 may obtain observation data directly from one or more direct reporting wireless devices (e.g., 150*a*) and may also obtain observation data indirectly from Wi-Fi AP Database 730, that receives observations from one or more indirect reporting wireless devices (e.g., 150*b*, 150*c*, and 150*d*). In such hybrid embodiments, observation data may be reported directly to asset tracking database 710 and/or reported indirectly to asset tracking database 710 by way of Wi-Fi AP Database 730. Asset tracking database 710 may give preference to, or value, observation data reported directly differently from observation data reported indirectly. The preference may be used in the location determination made by asset tracking database 710.

In still other embodiments, asset tracking database 710 may obtain observation data directly from one or more direct reporting wireless devices (e.g., 150*a*). In such embodiments, one or more wireless devices (e.g., 150*a*) may report observation data directly to asset tracking database 710 for use in the asset tracking task. The report of observation data may be received and processed as discussed in more detail herein and stored in asset tracking database 710, which may serve as the functional equivalent, and in lieu of, a Wi-Fi AP Database 730.

For purposes of illustration, one or more Wi-Fi access points 110 may be disposed on, attached to, or integrated with one or more moveable assets 610 that are desired to be tracked. The unique identifying information of a Wi-Fi access point 110 may be used to uniquely identify an asset 610 that it is physically and logically associated with the asset 610 in the asset tracking database 710. The one or more assets 610 may then be deployed in the field and need not be co-located. Advantageously, the deployed Wi-Fi access points 110 do not require any network or communication connectivity of any kind, nor are they required to receive GPS signals, they simply must either broadcast beacon frames (e.g., 220 of FIG. 2C) or respond to probe request frames (e.g., 230 of FIG. 2C) with probe response frames (e.g., 240 of FIG. 2C) as part of the Wi-Fi wireless network discovery process, each frame of which includes unique identifying information of the Wi-Fi access point 110.

When one or more wireless devices (e.g., 150) come into range of one or more Wi-Fi access points 110 disposed on, attached to, or integrated with one or more assets 610, each in-range Wi-Fi access point 110 may either broadcast their beacon frame (e.g., 220 of FIG. 2C) or respond to a probe request frame (e.g., 230 of FIG. 2C) with a probe response frame (e.g., 240 of FIG. 2C), each of which includes information that may be used by asset tracking database 710 to uniquely identify the Wi-Fi access point 110 and other information that may be useful to the asset tracking task, including custom use of certain information in the beacon frame (e.g., 220 of FIG. 2C) or probe response frame (e.g., 240 of FIG. 2C). The one or more wireless devices 150 may report observation data of the in-range Wi-Fi access points 110 encountered directly to the asset tracking database 710 and/or to the Wi-Fi AP Database 730 based on an application or design.

As previously discussed, wireless devices 150 report, via a cellular or other connection, observation data. Observation data includes, at least, unique identifying information, such as, for example, the BSSID, of the one or more Wi-Fi access points 110 encountered and location information of the one or more Wi-Fi access points 110 encountered. The location information may include coordinates such as latitude and longitude or other information that may be used to determine a location of a Wi-Fi access point 110 encountered. In certain embodiments, the observation data for a given Wi-Fi access point 110 may include one or more of the time, date, current location, speed, and direction of travel of the reporting wireless device 150 at or near the time of the encounter, and SSID, received signal strength, or other information pertaining to the Wi-Fi access point 110 encountered. In addition, observation data may include any of the above-noted information from other in-range Wi-Fi access points (e.g., 110) encountered at or near the same time that the given Wi-Fi access point 110 of interest was encountered. In some cases, the current location of the reporting wireless device 150 at or near the time of the encounter may be used, potentially in combination with other information, to establish a location of an encountered Wi-Fi access point 110 as of the time and date of the encounter.

The observation data may be reported directly to a Wi-Fi AP Database 730 maintained by an original equipment manufacturer of the wireless device 150, an operating system developer of an operating system executing on the wireless device 150, or third-party software developer and/or a dedicated asset tracking database 710 of the present invention that is used to track assets. The one or more wireless devices 150 may report their encounter with in-range Wi-Fi access points 110 at approximately the time of the encounter or at a later time if a wireless device 150 does not have network capabilities at the time of the encounter. Asset tracking database 710 may use observation data obtained directly from one or more wireless devices (e.g., 150*a*) and/or data obtained from Wi-Fi AP Database 730 (e.g., originating from 150*b*, 150*c*, and 150*d*) to identify and locate one or more assets (e.g., 610), the data of which may be stored in asset tracking database 710. Depending on the type of data received, asset tracking database 710 may manipulate, extrapolate, or generate additional data stored therein based on available relevant information.

While various embodiments of system 700 have been disclosed, one of ordinary skill in the art will recognize that a subset, superset, or combination of functions or features thereof, may be integrated, distributed, or excluded, in whole or in part, based on an application or design in accordance with one or more embodiments of the present invention and the disclosure is not intended to limit the types, kinds, or arrangements of system 700 that may be implemented, including those that include, integrate, distribute, separate, or exclude various aspects or features in accordance with one or more embodiments of the present invention.

Continuing, FIG. 7B shows an example of observation data 740 of one or more Wi-Fi access points (e.g., 110 of FIG. 7A) reported by a wireless device (e.g., 150*a* of FIG. 7A) based on an encounter in accordance with one or more embodiments of the present invention. As previously discussed, wireless devices (e.g., 150*a* of FIG. 7A) may report, via a cellular or any other network connection, observation data. Each report of observation data may include, at least, unique identifying information, such as, for example, the BSSID, of one or more Wi-Fi access points (e.g., 110 of FIG. 7A) encountered and location information of the one or more Wi-Fi access points (e.g., 110 of FIG. 7A) encountered. In certain embodiments, the observation data for a given Wi-Fi access point (e.g., 110) may include one or more of the time, date, current location, speed, and direction of travel of the reporting wireless device 150 at or near the time of the encounter, and SSID, received signal strength, or other information pertaining to the Wi-Fi access point (e.g., 110) encountered. In addition, observation data may include any of the above-noted information from other in-range Wi-Fi access points (e.g., 110) encountered at or near the same time that the given Wi-Fi access point (e.g., 110) of interest was encountered. The observation data may be reported directly to the asset tracking database (e.g., 710 of FIG. 7A) or to a Wi-Fi AP Database (e.g., 730 of FIG. 7A).

The unique identifying information may include any information that may be used to uniquely identify a Wi-Fi access point (e.g., 110 of FIG. 7A) encountered including any unique fields of the beacon frames (e.g., 220 of FIG. 2C) or probe response frames (e.g., 240 of FIG. 2C) transmitted therefrom that may be used or repurposed to convey information regarding the Wi-Fi access point (e.g., 110 of FIG. 7A) or the asset (e.g., 610 of FIG. 7A) it is associated with. For example, due to the unique nature of the BSSID, the BSSID of a Wi-Fi access point (e.g., 110 of FIG. 7A) may be used to uniquely identify the Wi-Fi access point (e.g., 110 of FIG. 7A) and an asset (e.g., 610 of FIG. 7A) it is physically disposed on, attached or, or integrated with and logically associated with in the asset tracking database (e.g., 710 of FIG. 7A). However, the MAC address, SSID, and/or other fields contained with the management frames may be used to further identify a Wi-Fi access point (e.g., 110 of FIG. 7A) as an asset tracking type of Wi-Fi access point or otherwise exploited for use in the asset tracking task. One of ordinary skill in the art will recognize any information transmitted from a Wi-Fi access point (e.g., 110 of FIG. 7A) as part of a beacon frame (e.g., 220 of FIG. 2C) or probe response frame (e.g., 240 of FIG. 2C) that may be used to uniquely identify the Wi-Fi access point (e.g., 110 of FIG. 7A) may be used in accordance with one or more embodiments of the present invention.

The location information may include coordinates representing a location such as latitude and longitude reported for the Wi-Fi access point (e.g., 110 of FIG. 7A) or any other information that may be used to determine the location of the Wi-Fi access point (e.g., 110 of FIG. 7A). For example, other information that may be used to determine a location of a particular Wi-Fi access point (e.g., 110 of FIG. 7A) may include RSSI, fingerprinting, angle of arrival, time of flight, or other data related to the Wi-Fi access point of interest (e.g., 110 of FIG. 7A) or any information related to other nearby in-range Wi-Fi access points (e.g., 110) that facilitate positioning.

One of ordinary skill in the art will recognize that the type and kind of information reported by a reporting wireless device (e.g., 150 of FIG. 7A) based on an encounter with a Wi-Fi access point (e.g., 110 of FIG. 7A) may vary based on an application or design in accordance with one or more embodiments of the present invention, but must include at least unique identifying information of the encountered Wi-Fi access point (e.g., 110 of FIG. 7A) and location information related thereto.

Continuing, FIG. 7C shows an example of asset data 740 stored or generated by asset tracking database (e.g., 710 of FIG. 7A) in accordance with one or more embodiments of the present invention. Asset tracking database (e.g., 710 of FIG. 7A) may associate unique identifying information, such as, for example, the BSSID, of a particular Wi-Fi access point (e.g., 110 of FIG. 7A) with a particular asset (e.g., 610 of FIG. 7A) on which it is disposed, attached to, or integrated with to identify the asset (e.g., 610 of FIG. 7A) within the system (e.g., 700 of FIG. 7A). Once associated, asset tracking database (e.g., 710 of FIG. 7A) may use observation data that is reported, directly or indirectly, by one or more wireless devices (e.g., 150 of FIG. 7A) that encounter the Wi-Fi access point (e.g., 110 of FIG. 7A) to passively track the asset (e.g., 610 of FIG. 7A), in many instances without an awareness by wireless devices (e.g., 150 of FIG. 7A), or users thereof, that they are participating in the asset tracking task.

Asset tracking database (e.g., 710 of FIG. 7A) may receive and store observation data obtained directly from a direct reporting wireless device (e.g., 150a of FIG. 7A) that reports an encounter with a Wi-Fi access point (e.g., 110 of FIG. 7A) or observation data obtained from a Wi-Fi AP Database (e.g., 730 of FIG. 7A). The observation data includes, at least, unique identifying information, such as, for example, the BSSID, of one or more Wi-Fi access points (e.g., 110) encountered and location information of the one or more Wi-Fi access points (e.g., 110) encountered. Asset tracking database (e.g., 710 of FIG. 7A) may also store one or more of a last known location for a Wi-Fi access point (e.g., 110 of FIG. 7A) and asset (e.g., 610) associated therewith, a history of last known locations for the Wi-Fi access point (e.g., 110 of FIG. 7A) and asset (e.g., 610) associated therewith, and a current location for the Wi-Fi access point (e.g., 110 of FIG. 7A) and asset (e.g., 610) associated therewith. Asset tracking database (e.g., 710 of FIG. 7A) may also receive and store one or more of the time, date, current location, speed, and direction of travel of the reporting wireless device (e.g., 150 of FIG. 7A) at or near the time of the encounter, and SSID, received signal strength, or other information pertaining to the Wi-Fi access point (e.g., 110) encountered. In addition, asset tracking database (e.g., 710 of FIG. 7A) may receive and store any of the above-noted information from other in-range Wi-Fi access points (e.g., 110) encountered at or near the same time that the Wi-Fi access point (e.g., 110) of interest was encountered.

In certain embodiments, asset tracking database (e.g., 710 of FIG. 7A) may determine a location for a moveable asset (e.g., 610 of FIG. 7A) to be tracked based on the last known reported location of its associated Wi-Fi access point (e.g., 110 of FIG. 7A). However, asset tracking database (e.g., 710 of FIG. 7A) may use one or more of historical data about the location of the Wi-Fi access point (e.g., 110 of FIG. 7A), the times, dates, last known locations, and received signal strengths to the Wi-Fi access point (e.g., 110 of FIG. 7A), and the times, dates, locations, last known locations, and received signal strengths to known Wi-Fi access points (e.g., 110) in the vicinity of the Wi-Fi access point of interest (e.g., 110 of FIG. 7A). Depending on the information available, well known GPS, Wi-Fi, location services, trilateration, triangulation, and any other positioning techniques may be used to determine or refine the accuracy of the location determination of the particular Wi-Fi access point (e.g., 110 of FIG. 7A) of interest and, by association, the location of the asset (e.g., 610 of FIG. 7A). As such, asset tracking database (e.g., 710 of FIG. 7A) may develop a historical trend of location and potentially other information relating to the particular asset (e.g., 610 of FIG. 7A) over a period of time. Thus, tracking accuracy may increase based on the number of observations obtained by the asset tracking database (e.g., 710 of FIG. 7A).

For purposes of example, asset tracking database (e.g., 710 of FIG. 7A) may include a data structure that includes a time, a date, a GPS or current location, for example, a latitude ("GPS LAT") and a longitude ("GPS LNG"), SSID, BSSID, and a received signal strength of a discovered Wi-Fi access point (e.g., 110 of FIG. 7A) as part of each report, received directly or indirectly, from a wireless device (e.g., 150 of FIG. 7A) that encounters an in-range Wi-Fi access point (e.g., 110 of FIG. 7A). The BSSID of the discovered Wi-Fi access point (e.g., 110 of FIG. 7A) may be associated with, or used to reference, a particular asset (e.g., 610) being tracked within asset tracking database (e.g., 710 of FIG. 7A). Asset tracking database (e.g., 710 of FIG. 7A) may receive, calculate, or estimate a last known ("AP LK") position of the discovered Wi-Fi access point (e.g., 110 of FIG. 7A). If a last know position of a Wi-Fi access point (e.g., 110 of FIG. 7A) is not known, it may be estimated by the GPS or current location of the most recent wireless device (e.g., 150 of FIG. 7A) that reported an observation of the Wi-Fi access point (e.g., 110 of FIG. 7A) or determined or further refined with well-known positioning techniques. Asset tracking database (e.g., 710 of FIG. 7A) may, based on available information, calculate a current ("AP CUR") location for one or more Wi-Fi access points (e.g., 110 of FIG. 7A), and by relation, the associated assets (e.g., 610 of FIG. 7A) thereof. One of ordinary skill in the art will appreciate that calculating a location based on the last known location of one or more Wi-Fi access points, if any, the GPS or current locations of one or more wireless devices (e.g., 150 of FIG. 7A) reporting the Wi-Fi access points (e.g., 110 of FIG. 7A), if available, and their relative received signal strengths, and potentially other information relating thereto, may be used to determine and/or refine the location determination of one or more Wi-Fi access points (e.g., 110 of FIG. 7A), and assets (e.g., 610 of FIG. 7A) associated therewith, using well-known positioning and location refinement techniques. The calculated current location may be stored in asset tracking database (e.g., 710 of FIG. 7A) as the best estimate of where a particular Wi-Fi access point (e.g., 110 of FIG. 7A), and by relation, the associated asset (e.g., 610 of FIG. 7A) may be located. The accuracy of the location determination may be enhanced with more observations by other wireless devices (e.g., 150) that come into range of the Wi-Fi access point (e.g., 110 of FIG. 7A) over time.

One of ordinary skill in the art will recognize that asset tracking database (e.g., 710 of FIG. 7A) may receive, generate, or store any other relevant data relating to a Wi-Fi access point (e.g., 110 of FIG. 7A), an asset (e.g., 610 of FIG. 7A) associated therewith, or any other information relevant to the asset tracking task based on an application or design in accordance with one or more embodiments of the present invention.

Figure 7D:
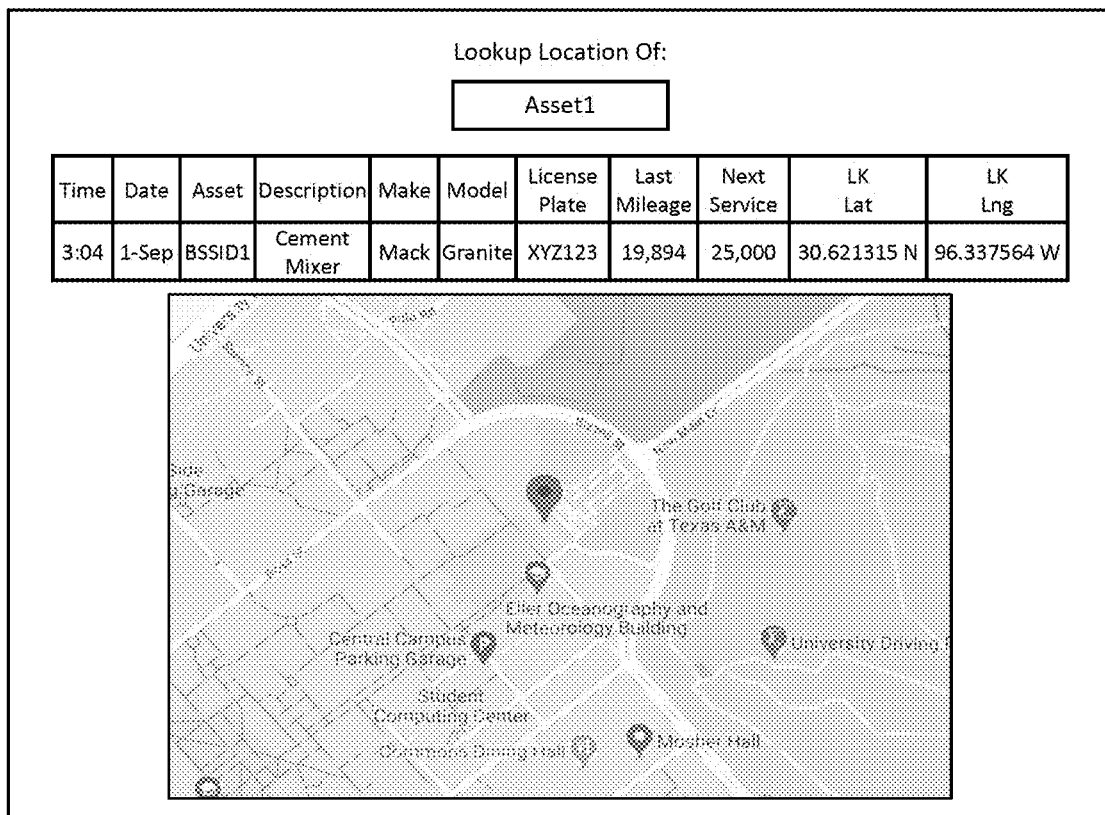
FIG. 7D shows an example of a client portal to an asset tracking database in accordance with one or more embodiments of the present invention.

FIG. 7D shows an example of a client portal 720 to an asset tracking database (e.g., 710 of FIG. 7A) in accordance with one or more embodiments of the present invention. A user (not shown) may access the data contained within asset tracking database (e.g., 710 of FIG. 7A) via client portal 720. Client portal 720 may provide the user with the ability to access at least some of the data stored in asset tracking database (e.g., 710 of FIG. 7A). For example, a user may inquire as to the location of a specific asset, in the example depicted, Asset1, which is a cement mixer truck. Client portal 720 lodges the query with asset tracking database (e.g., 710 of FIG. 7A), receives the requested data, which in this case, may include the unique identifying information of the asset (e.g., 610 of FIG. 7A) as well as its last known location and optionally a map showing the last known location. One of ordinary skill in the art will recognize that the interface, interaction with, and display of, data by client portal 720 may vary based on an application or design in accordance with one or more embodiments of the present invention.

In one or more embodiments of the present invention, a method of passive asset tracking may only use observations of Wi-Fi access points (e.g., 110 of FIG. 7A) received from a Wi-Fi AP Database (e.g., 730 of FIG. 7A).

In one or more embodiments of the present invention, Wi-Fi AP Database (e.g., 730 of FIG. 7A) may be a database of observation data including the unique identifying information of Wi-Fi access points (e.g., 110 of FIG. 7A) and location information of the Wi-Fi access points (e.g., 110 of FIG. 7A) encountered by one or more reporting wireless devices (e.g., 150*b*, 150*c*, and 150*d* of FIG. 7A). A Wi-Fi AP Database (e.g., 730 of FIG. 7A) may be established, operated, and maintained separate and apart from an asset tracking database (e.g., 710 of FIG. 7A). In certain embodiments, a Wi-Fi AP Database (e.g., 730 of FIG. 7A) may be a database of observation data maintained by an original equipment manufacturer of a wireless device (e.g., 150 of FIG. 7A). In other embodiments, a Wi-Fi AP Database (e.g., 730 of FIG. 7A) may be a database of observation data maintained by an operating system developer of an operating system executing on a wireless device (e.g., 150 of FIG. 7A). For example, the Wi-Fi AP Database (e.g., 730 of FIG. 7A) may be an Apple® iOS®, Google® Android®, or Microsoft® location services database typically used to improve the location determination accuracy for their respective end users. In still other embodiments, a Wi-Fi AP Database (e.g., 730 of FIG. 7A) may be a database of observation data maintained by a software developer. For example, the Wi-Fi AP Database (e.g., 730 of FIG. 7A) may be a database of observation data commercially offered by Cisco Systems®, Facebook®, WhatsApp®, X-Mode®, Ruckus®, and Skyhook®. In still other embodiments, Wi-Fi AP Database (e.g., 730 of FIG. 7A) may be any other type or kind of database of observation data in accordance with one or more embodiments of the present invention.

For the purpose of this disclosure, a Wi-Fi access point (e.g., 110 of FIG. 7A) may be a conventional Wi-Fi access point, an industrial Wi-Fi access point, a dummy Wi-Fi access point that spoofs, or emulates, at least portions of the Wi-Fi wireless network discovery process by either broadcasting beacon frames (e.g., 230 of FIG. 7A) or probe response frames (e.g., 240 of FIG. 2C), or any other type or kind of Wi-Fi access point (e.g., 110 of FIG. 7A) capable of participating in at least portions of the Wi-Fi wireless network discovery process. In certain embodiments, customized or dummy Wi-Fi access points (e.g., 110 of FIG. 7A) may eliminate unnecessary aspects or features to reduce the footprint and/or the power consumption of such a device. Notwithstanding, one of ordinary skill in the art will recognize that any type or kind of device capable of spoofing, or emulating, at least portions of the Wi-Fi network discovery process by either broadcasting beacon frames (e.g., 230 of FIG. 7A) or probe response frames (e.g., 240 of FIG. 2C) may be used in accordance with one or more embodiments of the present invention.

The method may include associating unique identifying information of a Wi-Fi access point (e.g., 110 of FIG. 7A) with a moveable asset (e.g., 610 of FIG. 7A) in an asset tracking database (e.g., 710 of FIG. 7A), wherein the Wi-Fi access point (e.g., 110 of FIG. 7A) is disposed on, attached to, or integrated with the moveable asset (e.g., 610 of FIG. 7A). The unique identifying information may be any information that uniquely identifies a Wi-Fi access point (e.g., 110 of FIG. 7A) including, for example, the BSSID of the Wi-Fi access point (e.g., 110 of FIG. 7A). The unique identifying information may be entered into the asset tracking database (e.g., 710 of FIG. 7A) and logically associated with the moveable asset (e.g., 610 of FIG. 7A) on which it is disposed, attached to, or otherwise integrated with for purposes of participating in the asset tracking task. In addition, any other information relating to the Wi-Fi access point (e.g., 110 of FIG. 7A) or moveable asset may be stored in the same or a related record of the asset tracking database (e.g., 710 of FIG. 7A).

The method may include receiving, at the asset tracking database (e.g., 710 of FIG. 7A), observation data (e.g., 740 of FIG. 7B) from a Wi-Fi AP Database (e.g., 730 of FIG. 7A) comprising the unique identifying information of the Wi-Fi access point (e.g., 110 of FIG. 7A) and location information of the Wi-Fi access point (e.g., 110 of FIG. 7A). The Wi-Fi AP Database (e.g., 730 of FIG. 7A) may receive observation data from one or more wireless devices (e.g., 150b, 150c, and 150d of FIG. 7A) that encounter the Wi-Fi access point (e.g., 110 of FIG. 7A) and report unique identifying information of the Wi-Fi access point (e.g., 110 of FIG. 7A) and location information of the Wi-Fi access point (e.g., 110 of FIG. 7A) to the Wi-Fi AP Database (e.g., 730 of FIG. 7A). In certain embodiments, the location information of the Wi-Fi access point (e.g., 110 of FIG. 7A) may comprise a latitude and a longitude of the Wi-Fi access point (e.g., 110 of FIG. 7A). In other embodiments, the location information of the Wi-Fi access point (e.g., 110 of FIG. 7A) may comprise a latitude and a longitude of the reporting wireless device (e.g., 150b, 150c, or 150d of FIG. 7A) at or near the time of its encounter with the Wi-Fi access point (e.g., 110 of FIG. 7A). In still other embodiments, the location information of the Wi-Fi access point (e.g., 110 of FIG. 7A) may comprise a received signal strength of the Wi-Fi access point (e.g., 110 of FIG. 7A) measured by the reporting wireless device (e.g., 150b, 150c, or 150d of FIG. 7A) at or near the time of its encounter with the Wi-Fi access point (e.g., 110 of FIG. 7A). In still other embodiments, the location information of the Wi-Fi access point (e.g., 110 of FIG. 7A) may comprise a latitude and a longitude of one or more other Wi-Fi access points (e.g., other nearby 110 not shown in FIG. 7A) near the Wi-Fi access point (e.g., 110 of FIG. 7A) at or near the time of a reporting wireless device's (e.g., 150b, 150c, or 150d of FIG. 7A) encounter with the Wi-Fi access point (e.g., 110 of FIG. 7A). In still other embodiments, the location information of the Wi-Fi access point (e.g., 110 of FIG. 7A) may comprise a location, a received signal strength, any of the above-noted information, or any other information related to one or more other Wi-Fi access points (e.g., other nearby 110 not shown in FIG. 7A) near the Wi-Fi access point (e.g., 110 of FIG. 7A) at or near the time of a reporting wireless device's (e.g., 150b, 150c, or 150d of FIG. 7A) encounter with the Wi-Fi access point (e.g., 110 of FIG. 7A).

The method may include determining, by the asset tracking database (e.g., 710 of FIG. 7A), a location of the moveable asset (e.g., 610 of FIG. 7A) based, at least in part, on observation data of the Wi-Fi access point (e.g., 110 of FIG. 7A). In certain embodiments, determining the location of the moveable asset (e.g., 610 of FIG. 7A) may include using a latitude and longitude of the Wi-Fi access point (e.g., 110 of FIG. 7A) as the location of the moveable asset (e.g., 610 of FIG. 7A). In other embodiments, determining the location of the moveable asset (e.g., 610 of FIG. 7A) may include using a latitude and longitude of a reporting wireless device (e.g., 150b, 150c, or 150d of FIG. 7A) at or near the time of its encounter with the Wi-Fi access point (e.g., 110 of FIG. 7A) as the location of the moveable asset (e.g., 610 of FIG. 7A). In still other embodiments, determining the location of the moveable asset (e.g., 610 of FIG. 7A) may include using a received signal strength of the Wi-Fi access point (e.g., 110 of FIG. 7A) measured by a reporting wireless device (e.g., 150b, 150c, or 150d of FIG. 7A) at or near the time of its encounter with the Wi-Fi access point (e.g., 110 of FIG. 7A) to determine the location of the moveable asset (e.g., 610 of FIG. 7A). Using well-known Wi-Fi positioning techniques, the received signal strength may be used to determine or enhance the location determination of the Wi-Fi access point (e.g., 110 of FIG. 7A). For example, the received signal strength may be used to determine a radius of a location of a reporting wireless device (e.g., 150b, 150c, or 150d of FIG. 7A) which may be used by itself or in combination with other location information to determine or enhance the location determination of the Wi-Fi access point (e.g., 110 of FIG. 7A). In still other embodiments, determining the location of the moveable asset (e.g., 610 of FIG. 7A) may include using a latitude and longitude of one or more other Wi-Fi access points (e.g., other nearby 110 not shown in FIG. 7A) encountered by a reporting wireless device (e.g., 150b, 150c, or 150d of FIG. 7A) at or near the time of its encounter with the Wi-Fi access point (e.g., 110 of FIG. 7A) to determine the location of the moveable asset (e.g., 610 of FIG. 7A). Using well known Wi-Fi positioning techniques, the locations of nearby Wi-Fi access points (e.g., other nearby 110 not shown in FIG. 7A) may be used alone or in combination to determine or enhance the location determination of the Wi-Fi access point (e.g., 110 of FIG. 7A). In still other embodiments, determining the location of the moveable asset (e.g., 610 of FIG. 7A) may include using a location, a received signal strength, any of the above-noted information, or any other information related to one or more other Wi-Fi access points (e.g., other nearby 110 not shown in FIG. 7A) near the Wi-Fi access point (e.g., 110 of FIG. 7A) at or near the time of a reporting wireless device's (e.g., 150b, 150c, or 150d of FIG. 7A) encounter with the Wi-Fi access point (e.g., 110 of FIG. 7A) to determine the location of the moveable asset (e.g., 610 of FIG. 7A). Using well known Wi-Fi positioning techniques, the received signal strengths of nearby Wi-Fi access points (e.g., other nearby 110 not shown in FIG. 7A) may be used alone or in combination to determine or enhance the location determination of the Wi-Fi access point (e.g., 110 of FIG. 7A).

One of ordinary skill in the art will recognize that historical location information, reporting wireless device (e.g., 150b, 150c, or 150d of FIG. 7A) location information, Wi-Fi access point (e.g., 110 of FIG. 7A) location information, other nearby Wi-Fi access point (e.g., other nearby 110 not shown in FIG. 7A) location information, received signal strength of the Wi-Fi access point (e.g., 110 of FIG. 7A) location information, received signal strength of other nearby Wi-Fi access point (e.g., other nearby 110 not shown in FIG. 7A) location information, and any other information may be used, alone or in combination, with known positioning techniques, including, but not limited to, smartphone positioning, network-based positioning, hybrid positioning, GPS positioning, cellular positioning, Wi-Fi positioning, triangulation, trilateration, time of arrival, angle of arrival, and any other positioning technique or combination thereof may be used in accordance with one or more embodiments of the present invention. Further, one of ordinary skill in the art will recognize that the positioning technique(s) used may vary based on the type or kind of observation data available at the time of the location determination.

The method may further include storing the location of the moveable asset (e.g., 610 of FIG. 7A) in the asset tracking database (e.g., 710 of FIG. 7A). The method may further include providing a user access, via a client portal (e.g., 720 of FIG. 7A), to the location of the moveable asset (e.g., 610 of FIG. 7A) stored in the asset tracking database (e.g., 710 of FIG. 7A). In certain embodiments, a client portal (e.g., 720 of FIG. 7A) may include a software interface for querying and receiving information from the asset tracking database (e.g., 710 of FIG. 7A). The client portal (e.g., 720 of FIG. 7A) may be part of the same computing system as that of the asset tracking database (e.g., 710 of FIG. 7A) or a separate and distinct computing system (e.g., 800 of FIG. 8) or wireless device (e.g., 150) that connects to the asset tracking database (e.g., 710 of FIG. 7A) over a network connection. The client portal (e.g., 720 of FIG. 7A) may be a web-based portal to the asset tracking database (e.g., 710 of FIG. 7A) or a standalone software application providing access to the asset tracking database (e.g., 710 of FIG. 7A) via a network connection.

Advantageously, there is no communication between the asset tracking database (e.g., 710 of FIG. 7A) and the one or more wireless devices (e.g., 150b, 150c, or 150d of FIG. 7A) that report an encounter with the Wi-Fi access point (e.g., 110 of FIG. 7A), comprising observation data, to the Wi-Fi AP Database (e.g., 730 of FIG. 7A), thereby enabling passive asset tracking in an open network environment where there is no required network connectivity. In this open network configuration, the existing infrastructure represented by the ecosystem of wireless devices (e.g., 150), such as, for example, smartphones, and the inherent reporting features wireless device operating systems or other software (e.g., 150) to report observation data of Wi-Fi access points (e.g., 110 of FIG. 7A) they encounter may be leveraged to passive track assets (e.g., 610 of FIG. 7A), without requiring an awareness on the part of the wireless device (e.g., 150), or user thereof, that they are participating in the asset tracking task. Further, the one or more wireless devices (e.g., 150b, 150c, or 150d of FIG. 7A), or users thereof, may not be aware that they are participating in the asset tracking task. The wireless devices (e.g., 150b, 150c, or 150d of FIG. 7A) simply report observation data of Wi-Fi access points (e.g., 110 of FIG. 7A) they encounter to the Wi-Fi AP Database (e.g., 730 of FIG. 7A), typically as part of their participation in location services.

In one or more embodiments of the present invention, a method of passive asset tracking may use first observation data received directly from one or more direct reporting wireless devices (e.g., 150a of FIG. 7A) and second observation data received from a Wi-Fi AP Database (e.g., 730 of FIG. 7A) that receives observation data from one or more indirect reporting wireless devices (e.g., 150b, 150c, or 150d of FIG. 7A).

In one or more embodiments of the present invention, a Wi-Fi AP Database (e.g., 730 of FIG. 7A) may be a database of observation data including the unique identifying information of Wi-Fi access points (e.g., 110 of FIG. 7A) and location information of the Wi-Fi access points (e.g., 110 of FIG. 7A) encountered by one or more indirect reporting wireless devices (e.g., 150b, 150c, and 150d of FIG. 7A). A Wi-Fi AP Database (e.g., 730 of FIG. 7A) may be established, operated, and maintained separate and apart from an asset tracking database (e.g., 710 of FIG. 7A). In certain embodiments, a Wi-Fi AP Database (e.g., 730 of FIG. 7A) may be a database of observation data maintained by an original equipment manufacturer of a wireless device (e.g., 150 of FIG. 7A). In other embodiments, a Wi-Fi AP Database (e.g., 730 of FIG. 7A) may be a database of observation data maintained by an operating system developer of an operating system executing on a wireless device (e.g., 150 of FIG. 7A). For example, the Wi-Fi AP Database (e.g., 730 of FIG. 7A) may be an Apple® iOS®, Google® Android®, or Microsoft® location services database typically used to improve the location determination accuracy for their respective end users. In still other embodiments, a Wi-Fi AP Database (e.g., 730 of FIG. 7A) may be a database of observation data maintained by a software developer. For example, the Wi-Fi AP Database (e.g., 730 of FIG. 7A) may be a database of observation data commercially offered by Cisco Systems®, Facebook®, WhatsApp®, X-Mode®, Ruckus®, and Skyhook®. In still other embodiments, Wi-Fi AP Database (e.g., 730 of FIG. 7A) may be any other type or kind of database of observation data in accordance with one or more embodiments of the present invention.

For the purpose of this disclosure, a Wi-Fi access point (e.g., 110 of FIG. 7A) may be a conventional Wi-Fi access point, an industrial Wi-Fi access point, a dummy Wi-Fi access point that spoofs, or emulates, at least portions of the Wi-Fi network discovery process by either broadcasting beacon frames (e.g., 230 of FIG. 7A) or probe response frames (e.g., 240 of FIG. 2C), or any other type or kind of Wi-Fi access point (e.g., 110 of FIG. 7A) capable of participating in at least portions of the Wi-Fi wireless network discovery process. In certain embodiments, customized or dummy Wi-Fi access points (e.g., 110 of FIG. 7A) may eliminate unnecessary features or aspects to reduce the footprint and/or the power consumption of such a device. Notwithstanding, one of ordinary skill in the art will recognize that any type or kind of device capable of spoofing, or emulating, at least portions of the Wi-Fi network discovery process by either broadcasting beacon frames (e.g., 230 of FIG. 7A) or probe response frames (e.g., 240 of FIG. 2C) may be used in accordance with one or more embodiments of the present invention.

The method may include associating unique identifying information of a Wi-Fi access point (e.g., 110 of FIG. 7A) with a moveable asset (e.g., 610 of FIG. 7A) in an asset tracking database (e.g., 710 of FIG. 7A), wherein the Wi-Fi access point (e.g., 110 of FIG. 7A) is disposed on, attached to, or integrated with the moveable asset (e.g., 610 of FIG. 7A). The unique identifying information may be any information that uniquely identifies a Wi-Fi access point (e.g., 110 of FIG. 7A) including, for example, the BSSID of the Wi-Fi access point (e.g., 110 of FIG. 7A). The unique identifying information may be entered into the asset tracking database (e.g., 710 of FIG. 7A) and logically associated with the moveable asset (e.g., 610 of FIG. 7A) on which it is disposed, attached to, or otherwise integrated with for purposes of participating in the asset tracking task. In addition, any other information relating to the Wi-Fi access point (e.g., 110 of FIG. 7A) or asset may be stored in the same or a related record of the asset tracking database (e.g., 710 of FIG. 7A).

The method may include receiving, at the asset tracking database (e.g., 710 of FIG. 7A), first observation data observation data (e.g., 740 of FIG. 7B) from one or more direct reporting wireless devices (e.g., 150a of FIG. 7A) that encounter the Wi-Fi access point (e.g., 110 of FIG. 7A) comprising the unique identifying information of the Wi-Fi access point (e.g., 110 of FIG. 7A) and first location information of the Wi-Fi access point (e.g., 110 of FIG. 7A).

The method may include receiving, at the asset tracking database (e.g., 710 of FIG. 7A), second observation data (e.g., 740 of FIG. 7B) from a Wi-Fi AP Database (e.g., 730 of FIG. 7A) comprising the unique identifying information of the Wi-Fi access point (e.g., 110 of FIG. 7A) and location information of the Wi-Fi access point (e.g., 110 of FIG. 7A). The Wi-Fi AP Database (e.g., 730 of FIG. 7A) may receive observation data from one or more indirect reporting wireless devices (e.g., 150b, 150c, and 150d of FIG. 7A) that encounter the Wi-Fi access point (e.g., 110 of FIG. 7A) and report unique identifying information of the Wi-Fi access point (e.g., 110 of FIG. 7A) and location information of the Wi-Fi access point (e.g., 110 of FIG. 7A) to the Wi-Fi AP Database (e.g., 730 of FIG. 7A).

In certain embodiments, the location information of the Wi-Fi access point (e.g., 110 of FIG. 7A) may a latitude and a longitude of the Wi-Fi access point (e.g., 110 of FIG. 7A). In other embodiments, the location information of the Wi-Fi access point (e.g., 110 of FIG. 7A) may comprise a latitude and a longitude of a reporting wireless device (e.g., 150*b*, 150*c*, or 150*d* of FIG. 7A) at or near the time of its encounter with the Wi-Fi access point (e.g., 110 of FIG. 7A). In still other embodiments, the location information of the Wi-Fi access point (e.g., 110 of FIG. 7A) may comprise a received signal strength of the Wi-Fi access point (e.g., 110 of FIG. 7A) measured by a reporting wireless device (e.g., 150*b*, 150*c*, or 150*d* of FIG. 7A) at or near the time of its encounter with the Wi-Fi access point (e.g., 110 of FIG. 7A). In still other embodiments, the location information of the Wi-Fi access point (e.g., 110 of FIG. 7A) may comprise a latitude and a longitude of one or more other Wi-Fi access points (e.g., other nearby 110 not shown in FIG. 7A) near the Wi-Fi access point (e.g., 110 of FIG. 7A) at or near the time of a reporting wireless device's (e.g., 150*b*, 150*c*, or 150*d* of FIG. 7A) encounter with the Wi-Fi access point (e.g., 110 of FIG. 7A). In still other embodiments, the location information of the Wi-Fi access point (e.g., 110 of FIG. 7A) may comprise a location, a received signal strength, any of the above-noted information, or any other information related to one or more other Wi-Fi access points (e.g., other nearby 110 not shown in FIG. 7A) near the Wi-Fi access point (e.g., 110 of FIG. 7A) at or near the time of a reporting wireless device's (e.g., 150*b*, 150*c*, or 150*d* of FIG. 7A) encounter with the Wi-Fi access point (e.g., 110 of FIG. 7A).

The method may include determining, by the asset tracking database (e.g., 710 of FIG. 7A), a location of the moveable asset (e.g., 610 of FIG. 7A) based, at least in part, on the first and/or the second observation data of the Wi-Fi access point (e.g., 110 of FIG. 7A). In certain embodiments, determining the location of the moveable asset (e.g., 610 of FIG. 7A) may include using a latitude and longitude of the Wi-Fi access point (e.g., 110 of FIG. 7A) as the location of the moveable asset (e.g., 610 of FIG. 7A). In other embodiments, determining the location of the moveable asset (e.g., 610 of FIG. 7A) may include using a latitude and longitude of a reporting wireless device (e.g., 150*b*, 150*c*, or 150*d* of FIG. 7A) at or near the time of its encounter with the Wi-Fi access point (e.g., 110 of FIG. 7A) as the location of the moveable asset (e.g., 610 of FIG. 7A). In still other embodiments, determining the location of the moveable asset (e.g., 610 of FIG. 7A) may include using a received signal strength of the Wi-Fi access point (e.g., 110 of FIG. 7A) measured by a reporting wireless device (e.g., 150*b*, 150*c*, or 150*d* of FIG. 7A) at or near the time of its encounter with the Wi-Fi access point (e.g., 110 of FIG. 7A) to determine the location of the moveable asset (e.g., 610 of FIG. 7A). Using well-known Wi-Fi positioning techniques, the received signal strength may be used to determine or enhance the location determination of the Wi-Fi access point (e.g., 110 of FIG. 7A). For example, the received signal strength may be used to determine a radius of a location of a reporting wireless device (e.g., 150*b*, 150*c*, or 150*d* of FIG. 7A) which may be used by itself or in combination with other location information to determine or enhance the location determination of the Wi-Fi access point (e.g., 110 of FIG. 7A). In still other embodiments, determining the location of the moveable asset (e.g., 610 of FIG. 7A) may include using a latitude and longitude of one or more other Wi-Fi access points (e.g., other nearby 110 not shown in FIG. 7A) encountered by a reporting wireless device (e.g., 150*b*, 150*c*, or 150*d* of FIG. 7A) at or near the time of its encounter with the Wi-Fi access point (e.g., 110 of FIG. 7A) to determine the location of the moveable asset (e.g., 610 of FIG. 7A). Using well known Wi-Fi positioning techniques, the locations of nearby Wi-Fi access points (e.g., other nearby 110 not shown in FIG. 7A) may be used by itself or in combination to determine or enhance the location determination of the Wi-Fi access point (e.g., 110 of FIG. 7A). In still other embodiments, determining the location of the moveable asset (e.g., 610 of FIG. 7A) may include using a location, a received signal strength, any of the above-noted information, or any other information related to one or more other Wi-Fi access points (e.g., other nearby 110 not shown in FIG. 7A) near the Wi-Fi access point (e.g., 110 of FIG. 7A) at or near the time of a reporting wireless device's (e.g., 150*b*, 150*c*, or 150*d* of FIG. 7A) encounter with the Wi-Fi access point (e.g., 110 of FIG. 7A) to determine the location of the moveable asset (e.g., 610 of FIG. 7A). Using well known Wi-Fi positioning techniques, the received signal strengths of nearby Wi-Fi access points (e.g., other nearby 110 not shown in FIG. 7A) may be used by itself or in combination to determine or enhance the location determination of the Wi-Fi access point (e.g., 110 of FIG. 7A).

One of ordinary skill in the art will recognize that historical location information, reporting wireless device (e.g., 150*b*, 150*c*, or 150*d* of FIG. 7A) location information, Wi-Fi access point (e.g., 110 of FIG. 7A) location information, other nearby Wi-Fi access point (e.g., other nearby 110 not shown in FIG. 7A) location information, received signal strength of the Wi-Fi access point (e.g., 110 of FIG. 7A) location information, received signal strength of other nearby Wi-Fi access point (e.g., other nearby 110 not shown in FIG. 7A) location information, and any other information relating to the Wi-Fi access point (e.g., 110 of FIG. 7A) or nearby Wi-Fi access points (e.g., other nearby 110 not shown in FIG. 7A) may be used, alone or in combination, with known positioning techniques, including, but not limited to, smartphone positioning, network-based positioning, hybrid positioning, GPS positioning, cellular positioning, triangulation, trilateration, time of arrival, angle of arrival, and any other positioning technique or combination of positioning techniques may be used in accordance with one or more embodiments of the present invention. Further, one of ordinary skill in the art will recognize that, the positioning technique or techniques used may vary based on the type or kind of observation data available at the time of the location determination.

The method may further include storing the location of the moveable asset (e.g., 610 of FIG. 7A) in the asset tracking database (e.g., 710 of FIG. 7A). The method may further include providing a user access, via a client portal (e.g., 720 of FIG. 7A), to the location of the moveable asset (e.g., 610 of FIG. 7A) stored in the asset tracking database (e.g., 710 of FIG. 7A). In certain embodiments, a client portal (e.g., 720 of FIG. 7A) may include a software interface for querying and receiving information from the asset tracking database (e.g., 710 of FIG. 7A). The client portal (e.g., 720 of FIG. 7A) may be part of the same computing system as that of the asset tracking database (e.g., 710 of FIG. 7A) or a separate and distinct computing system (e.g., 800 of FIG. 8) or wireless device (e.g., 150) that connects to the asset tracking database (e.g., 710 of FIG. 7A) over a network connection. The client portal (e.g., 720 of FIG. 7A) may be a web-based portal to the asset tracking database (e.g., 710 of FIG. 7A) or a standalone software application providing access to the asset tracking database (e.g., 710 of FIG. 7A) via a network connection.

Advantageously, there is no communication between the asset tracking database (e.g., 710 of FIG. 7A) and the one or more indirect reporting wireless devices (e.g., 150b, 150c, or 150d of FIG. 7A) that report an encounter with the Wi-Fi access point (e.g., 110 of FIG. 7A), comprising observation data, to the Wi-Fi AP Database (e.g., 730 of FIG. 7A), thereby enabling passive, and potentially anonymous, asset tracking in areas where there is no network connectivity. In this hybrid open-network configuration, the existing infrastructure represented by the ecosystem of wireless devices (e.g., 150), such as, for example, smartphones, and the inherent reporting features wireless device operating systems or other software (e.g., 150) to report observation data of Wi-Fi access points (e.g., 110 of FIG. 7A) they encounter may be leveraged to passive track assets (e.g., 610 of FIG. 7A), without requiring an awareness on the part of the wireless device (e.g., 150), or user thereof, that they are participating in the asset tracking task. Further, the one or more wireless devices (e.g., 150b, 150c, or 150d of FIG. 7A), or users thereof, may not be aware that they are participating in the asset tracking task. The wireless devices (e.g., 150b, 150c, or 150d of FIG. 7A) simply report observation data of Wi-Fi access points (e.g., 110 of FIG. 7A) they encounter to the Wi-Fi AP Database (e.g., 730 of FIG. 7A), typically as part of their participation in location services.

In one or more embodiments of the present invention, a method of passive asset tracking may use observation data received directly from one or more direct reporting wireless devices (e.g., 150a of FIG. 7A) that encounter a Wi-Fi access point (e.g., 110 of FIG. 7A).

For the purpose of this disclosure, a Wi-Fi access point (e.g., 110 of FIG. 7A) may be a conventional Wi-Fi access point, an industrial Wi-Fi access point, a dummy Wi-Fi access point that spoofs, or emulates, at least portions of the Wi-Fi network discovery process by either broadcasting beacon frames (e.g., 230 of FIG. 7A) or probe response frames (e.g., 240 of FIG. 2C), or any other type or kind of Wi-Fi access point (e.g., 110 of FIG. 7A) capable of participating in at least portions of the Wi-Fi wireless network discovery process. In certain embodiments, customized or dummy Wi-Fi access points (e.g., 110 of FIG. 7A) may eliminate unnecessary features or aspects to reduce the footprint and/or the power consumption of such a device. Notwithstanding, one of ordinary skill in the art will recognize that any type or kind of device capable of spoofing, or emulating, at least portions of the Wi-Fi network discovery process by either broadcasting beacon frames (e.g., 230 of FIG. 7A) or probe response frames (e.g., 240 of FIG. 2C) may be used in accordance with one or more embodiments of the present invention.

The method may include associating unique identifying information of a Wi-Fi access point (e.g., 110 of FIG. 7A) with a moveable asset (e.g., 610 of FIG. 7A) in an asset tracking database (e.g., 710 of FIG. 7A), wherein the Wi-Fi access point (e.g., 110 of FIG. 7A) is disposed on, attached to, or integrated. The unique identifying information may be any information that uniquely identifies a Wi-Fi access point (e.g., 110 of FIG. 7A) including, for example, the BSSID of the Wi-Fi access point (e.g., 110 of FIG. 7A). The unique identifying information may be entered into the asset tracking database (e.g., 710 of FIG. 7A) and logically associated with the moveable asset (e.g., 610 of FIG. 7A) on which it is disposed, attached to, or otherwise integrated with for purposes of participating in the asset tracking task. In addition, any other information relating to the Wi-Fi access point (e.g., 110 of FIG. 7A) or asset may be stored in the same or a related record of the asset tracking database (e.g., 710 of FIG. 7A).

The method may include receiving, at the asset tracking database (e.g., 710 of FIG. 7A), observation data (e.g., 740 of FIG. 7B) from one or more direct reporting wireless devices (e.g., 150a of FIG. 7A) that encounter the Wi-Fi access point (e.g., 110 of FIG. 7A) comprising the unique identifying information of the Wi-Fi access point (e.g., 110 of FIG. 7A) and location information of the Wi-Fi access point (e.g., 110 of FIG. 7A).

In certain embodiments, the location information of the Wi-Fi access point (e.g., 110 of FIG. 7A) may a latitude and a longitude of the Wi-Fi access point (e.g., 110 of FIG. 7A). In other embodiments, the location information of the Wi-Fi access point (e.g., 110 of FIG. 7A) may comprise a latitude and a longitude of a reporting wireless device (e.g., 150a of FIG. 7A) at or near the time of its encounter with the Wi-Fi access point (e.g., 110 of FIG. 7A). In still other embodiments, the location information of the Wi-Fi access point (e.g., 110 of FIG. 7A) may comprise a received signal strength of the Wi-Fi access point (e.g., 110 of FIG. 7A) measured by a reporting wireless device (e.g., 150a of FIG. 7A) at or near the time of its encounter with the Wi-Fi access point (e.g., 110 of FIG. 7A). In still other embodiments, the location information of the Wi-Fi access point (e.g., 110 of FIG. 7A) may comprise a latitude and a longitude of one or more other Wi-Fi access points (e.g., other nearby 110 not shown in FIG. 7A) near the Wi-Fi access point (e.g., 110 of FIG. 7A) at or near the time of a reporting wireless device's (e.g., 150a of FIG. 7A) encounter with the Wi-Fi access point (e.g., 110 of FIG. 7A). In still other embodiments, the location information of the Wi-Fi access point (e.g., 110 of FIG. 7A) may comprise a location, a received signal strength, any of the above-noted information, or any other information relating to one or more other Wi-Fi access points (e.g., other nearby 110 not shown in FIG. 7A) near the Wi-Fi access point (e.g., 110 of FIG. 7A) at or near the time of a reporting wireless device's (e.g., 150a of FIG. 7A) encounter with the Wi-Fi access point (e.g., 110 of FIG. 7A).

The method may include determining a location of the moveable asset (e.g., 610 of FIG. 7A) based, at least in part, on the observation data of the Wi-Fi access point (e.g., 110 of FIG. 7A). In certain embodiments, determining the location of the moveable asset (e.g., 610 of FIG. 7A) may include using a latitude and longitude of the Wi-Fi access point (e.g., 110 of FIG. 7A) as the location of the moveable asset (e.g., 610 of FIG. 7A). In other embodiments, determining the location of the moveable asset (e.g., 610 of FIG. 7A) may include using a latitude and longitude of a reporting wireless device (e.g., 150a of FIG. 7A) at or near the time of its encounter with the Wi-Fi access point (e.g., 110 of FIG. 7A) as the location of the moveable asset (e.g., 610 of FIG. 7A). In still other embodiments, determining the location of the moveable asset (e.g., 610 of FIG. 7A) may include using a received signal strength of the Wi-Fi access point (e.g., 110 of FIG. 7A) measured by a reporting wireless device (e.g., 150a of FIG. 7A) at or near the time of its encounter with the Wi-Fi access point (e.g., 110 of FIG. 7A) to determine the location of the moveable asset (e.g., 610 of FIG. 7A). Using well-known Wi-Fi positioning techniques, the received signal strength may be used to determine or enhance the location determination of the Wi-Fi access point (e.g., 110 of FIG. 7A). For example, the received signal strength may be used to determine a radius of a location of a reporting wireless device (e.g., 150a of FIG. 7A) which may be used by itself or in combination with other location information to determine or enhance the location determination of the Wi-Fi access point (e.g., 110 of FIG. 7A). In still other embodiments, determining the location of the moveable asset (e.g., 610 of FIG. 7A) may include using a latitude and longitude of one or more other Wi-Fi access points (e.g., other nearby 110 not shown in FIG. 7A) encountered by a reporting wireless device (e.g., 150*a* of FIG. 7A) at or near the time of its encounter with the Wi-Fi access point (e.g., 110 of FIG. 7A) to determine the location of the moveable asset (e.g., 610 of FIG. 7A). Using well known Wi-Fi positioning techniques, the locations of nearby Wi-Fi access points (e.g., other nearby 110 not shown in FIG. 7A) may be used by itself or in combination to determine or enhance the location determination of the Wi-Fi access point (e.g., 110 of FIG. 7A). In still other embodiments, determining the location of the moveable asset (e.g., 610 of FIG. 7A) may include using a location, a received signal strength, any of the above-noted information, or any other information related to one or more other Wi-Fi access points (e.g., other nearby 110 not shown in FIG. 7A) near the Wi-Fi access point (e.g., 110 of FIG. 7A) at or near the time of a reporting wireless device's (e.g., 150*a*) encounter with the Wi-Fi access point (e.g., 110 of FIG. 7A) to determine the location of the moveable asset (e.g., 610 of FIG. 7A). Using well known Wi-Fi positioning techniques, the received signal strengths of nearby Wi-Fi access points (e.g., other nearby 110 not shown in FIG. 7A) may be used by itself or in combination to determine or enhance the location determination of the Wi-Fi access point (e.g., 110 of FIG. 7A).

One of ordinary skill in the art will recognize that historical location information, reporting wireless device (e.g., 150*a* of FIG. 7A) location information, Wi-Fi access point (e.g., 110 of FIG. 7A) location information, other nearby Wi-Fi access point (e.g., other nearby 110 not shown in FIG. 7A) location information, received signal strength of the Wi-Fi access point (e.g., 110 of FIG. 7A) location information, received signal strength of other nearby Wi-Fi access point (e.g., other nearby 110 not shown in FIG. 7A) location information, and any other information relating to the Wi-Fi access point (e.g., 110 of FIG. 7A) or nearby Wi-Fi access points (e.g., other nearby 110 not shown in FIG. 7A) may be used, alone or in combination, with known positioning techniques, including, but not limited to, smartphone positioning, network-based positioning, hybrid positioning, GPS positioning, cellular positioning, triangulation, trilateration, time of arrival, angle of arrival, and any other positioning technique or combination of positioning techniques may be used in accordance with one or more embodiments of the present invention. Further, one of ordinary skill in the art will recognize that, the positioning technique or techniques used may vary based on the type or kind of observation data available at the time of the location determination.

The method may further include storing the location of the moveable asset (e.g., 610 of FIG. 7A) in the asset tracking database (e.g., 710 of FIG. 7A). The method may further include providing a user access, via the client portal (e.g., 720 of FIG. 7A), to the location of the moveable asset (e.g., 610 of FIG. 7A) stored in the asset tracking database (e.g., 710 of FIG. 7A). In certain embodiments, a client portal (e.g., 720 of FIG. 7A) may include a software interface for querying and receiving information from the asset tracking database (e.g., 710 of FIG. 7A). The client portal (e.g., 720 of FIG. 7A) may be part of the same computing system as that of the asset tracking database (e.g., 710 of FIG. 7A) or a separate and distinct computing system (e.g., 800 of FIG. 8) or wireless device (e.g., 150) that connects to the asset tracking database (e.g., 710 of FIG. 7A) over a network connection. The client portal (e.g., 720 of FIG. 7A) may be a web-based portal to the asset tracking database (e.g., 710 of FIG. 7A) or a standalone software application providing access to the asset tracking database (e.g., 710 of FIG. 7A) via a network connection.

The method may further include providing one or more wireless devices (e.g., 150*a* of FIG. 7A), from the asset tracking database (e.g., 710 of FIG. 7A), with the unique identifying information of the Wi-Fi access point to limit observation data reported by the one or more wireless devices (e.g., 150*a* of FIG. 7A) to data relevant to the Wi-Fi access point (e.g., 110 of FIG. 7A) associated with the moveable asset (e.g., 610 of FIG. 7A) to be tracked. The one or more wireless devices (e.g., 150*a* of FIG. 7A) may limit the observation data reported directly to the asset tracking database (e.g., 710 of FIG. 7A) to observation data relevant to Wi-Fi access point (e.g., 110 of FIG. 7A) associated with the moveable asset (e.g., 610 of FIG. 7A) to be tracked. The unique identifying information may be provided at any time, including, prior to receiving observation data from the one or more wireless devices (e.g., 150*a* of FIG. 7A) that encounter the Wi-Fi access point (e.g., 110 of FIG. 7A).

The method may further include filtering, at the asset tracking database (e.g., 710 of FIG. 7A), observation data received from one or more wireless devices (e.g., 150*a* of FIG. 7A) to data relevant to the Wi-Fi access point (e.g., 110 of FIG. 7A) associated with the moveable asset (e.g., 610 of FIG. 7A) to be tracked. Filtering may be performed by the asset tracking database (e.g., 710 of FIG. 7A) at any time, including, after receiving observation data from the one or more wireless devices (e.g., 150*a* of FIG. 7A) that encounter the Wi-Fi access point (e.g., 110 of FIG. 7A).

In this configuration, limiting and/or filtering observation data to data relevant to the Wi-Fi access point (e.g., 110 of FIG. 7A) associated with the moveable asset (e.g., 610 of FIG. 7A) to be tracked may enhance tracking capabilities and reduce latency in both reporting observation data and querying the asset tracking database (e.g., 710 of FIG. 7A).

In one or more embodiments of the present invention, a method of passive asset tracking with existing independent infrastructure may include disposing a Wi-Fi access point on, in, or otherwise attaching to, or integrating with, a moveable physical asset to be tracked. The Wi-Fi access point may be a conventional off-the-shelf, industrial, battery-powered, or any other type or kind of Wi-Fi access point. However, because the Wi-Fi access point does not require routing features or true Wi-Fi functionality beyond that of participating in the Wi-Fi wireless network discovery protocol, custom Wi-Fi access points that eliminate features not implemented may be used to reduce the footprint and the power consumption of such a device. In addition, devices configured to spoof the Wi-Fi wireless network discovery protocol may be used specifically for the asset tracking task. Notwithstanding, one of ordinary skill in the art will recognize that any Wi-Fi access point, or related device, capable of participating in Wi-Fi wireless network discovery protocol may be used in accordance with one or more embodiments of the present invention.

The method may further include logically associating unique identifying information of the Wi-Fi access point with the asset in an asset tracking database. The unique identifying information may be any information that uniquely identifies the Wi-Fi access point including, for example, the BSSID of the Wi-Fi access point. The asset tracking database may be any type or kind of database or software application configured to store and potentially manipulate data. The Wi-Fi access point associated with a particular moveable asset may be stored in the same or a related record in the asset tracking database or otherwise related indicating their association, specifically, using the location of the Wi-Fi access point as a proxy for the location of the asset.

The method may further include receiving information relating to a location of the Wi-Fi access point encountered by one or more wireless devices and storing at least part of the information received in the asset tracking database. In certain embodiments, the information relating to the location of the Wi-Fi access point encountered is received directly or indirectly from a Wi-Fi AP Database or third-party provider. In other embodiments, the information relating to the location of the Wi-Fi access point encountered is received directly or indirectly from one or more of the reporting wireless devices. In certain embodiments, the one or more wireless devices, or users thereof, may not be aware that they are participating in the asset tracking task. The wireless devices simply report their location and the unique identifying information of Wi-Fi access points they encounter as part of their participation in location services. In other embodiments, the one or more wireless devices may be used to intentionally participate in the asset tracking task. In all such embodiments, whenever a wireless device comes in-range of a Wi-Fi access point and receives unique identifying information about the Wi-Fi access point, the wireless device reports at least its location and the unique identifying information of the Wi-Fi access point, typically over a cellular connection, directly or indirectly to one or more of an original equipment manufacturer, an operating system developer, a location-based services provider, a Wi-Fi AP Database, or a third-party software application or database, or directly to the asset tracking database itself. The information relating to the location of the wireless device may include, for example, a time, a data, a GPS location of the reporting wireless device, a last known location of the Wi-Fi access point, the unique identifying information of other in-range Wi-Fi access points, and their respective signal strengths. One of ordinary skill in the art will recognize that other information may be used and may vary based on an application or design in accordance with one or more embodiments of the present invention. As such, the information relating to the location of the Wi-Fi access point may be received by the asset tracking database directly or indirectly from one or more wireless devices that report their location as well as the unique identifying information of one or more Wi-Fi access points that they encounter.

The method may further include tracking the location of the Wi-Fi access point, and by relation, the asset itself, in the asset tracking database. The asset tracking database may maintain a record of reports relating to the Wi-Fi access point and receive or calculate an estimated location for the Wi-Fi access point, and by relation, the asset itself. This information may be stored in the asset tracking database as the estimated current location of the asset with any other information suitable for storing in the asset tracking database. As noted above, the asset tracking database may receive information that provides an estimate of a location of the Wi-Fi access point or information that may be used to estimate the location of the Wi-Fi access point using one or more of GPS determined locations, Wi-Fi access point locations and potentially associated received signal strengths, trilateration, or triangulation. The method may further include providing a user access to information stored in the asset tracking database via a client portal. The client portal may include a software interface for querying and receiving information from the asset tracking database. The client portal may be part of the same computing system as that of the asset tracking database or a separate and distinct computing system or wireless device that connects to the asset tracking database over a network connection. In one or more embodiments of the present invention, a non-transitory computer readable medium comprising software instructions, when executed by a processor, may perform any of the above-noted methods.

In one or more embodiments of the present invention, a system for passive asset tracking with existing independent infrastructure may include a computing system having a central processing unit, a system memory, a network interface, and a storage device and a Wi-Fi access point disposed on, in, or otherwise attached to, a moveable asset to be tracked. An asset tracking database executing on the computing system may associate unique identifying information of the Wi-Fi access point with the asset. The asset tracking database may receive information relating to a location of the Wi-Fi access point identified by its unique identifying information transmitted as part of Wi-Fi wireless network discovery. The asset tracking database may track the location of the Wi-Fi access point and, by relation, the associated asset.

In one or more embodiments of the present invention, a non-transitory computer readable medium comprising software instructions, when executed by a processor, may perform any of the above-noted methods in accordance with one or more embodiments of the present invention.

Figure 8:
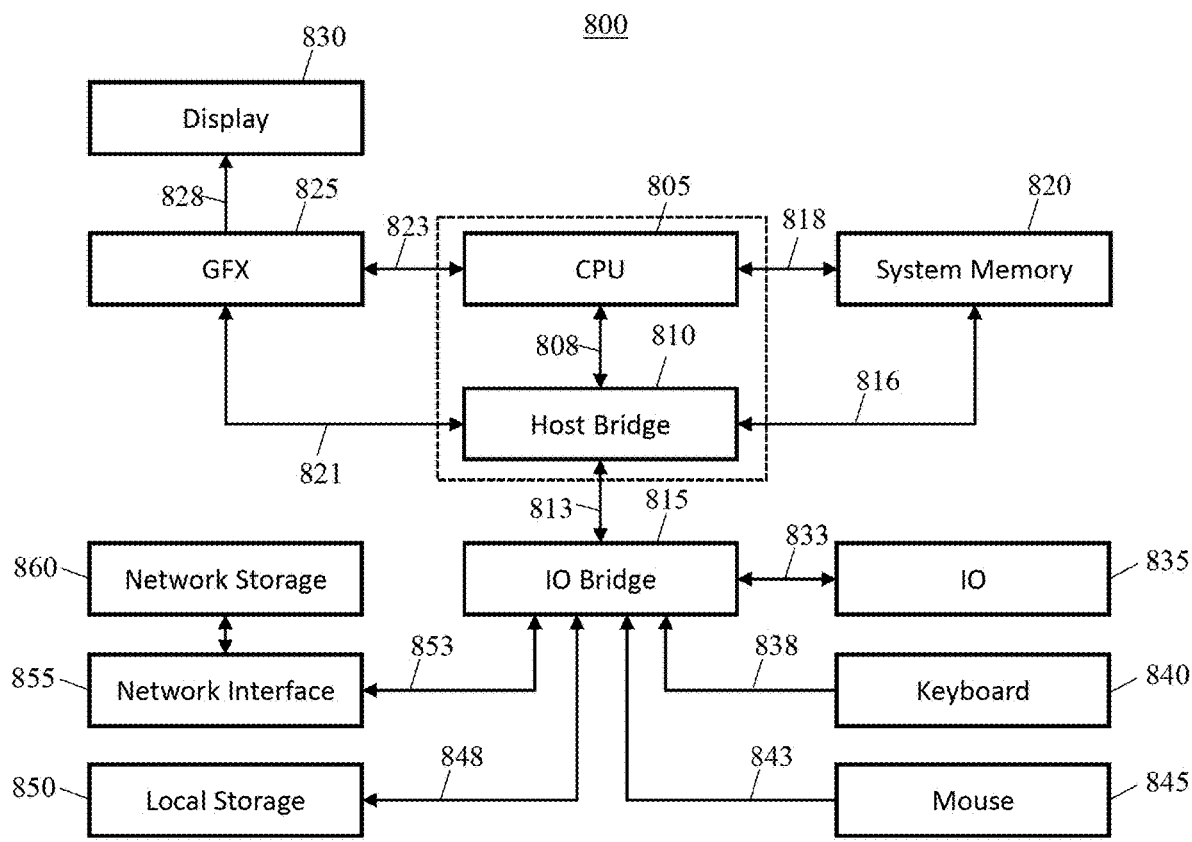
FIG. 8 shows a computing system in accordance with one or more embodiments of the present invention.

FIG. 8 shows a computing system 800 in accordance with one or more embodiments of the present invention. One or more of asset tracking database (e.g., 710 of FIG. 7A) and client portal (e.g., 720 of FIG. 7A) may be software applications containing software instructions that, when executed by a processor of one or more computing systems 800, perform one or more of the methods described herein. One of ordinary skill in the art will recognize that a computing system 800 disclosed herein is merely exemplary of a computing system that may be used to execute any of the above-noted software methods and other computing systems that are well known in the art may be used in accordance with one or more embodiments of the present invention.

Computing system 800 may include one or more central processing units, sometimes referred to as processors (hereinafter referred to in the singular as "CPU" or plural as "CPUs") 805, host bridge 810, input/output ("IO") bridge 815, graphics processing units (singular "GPU" or plural "GPUs") 825, and/or application-specific integrated circuits (singular "ASIC or plural "ASICs") (not shown) disposed on one or more printed circuit boards (not shown) that perform computational operations. Each of the one or more CPUs 805, GPUs 825, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 805 may be a general-purpose computational device typically configured to execute software instructions. CPU 805 may include an interface 808 to host bridge 810, an interface 818 to system memory 820, and an interface 823 to one or more IO devices, such as, for example, one or more GPUs 825. GPU 825 may serve as a specialized computational device typically configured to perform graphics functions related to frame buffer manipulation. However, one of ordinary skill in the art will recognize that GPU 825 may be used to perform non-graphics related functions that are computationally intensive. In certain embodiments, GPU 825 may interface 823 directly with CPU 805 (and interface 818 with system memory 820 through CPU 805). In other embodiments, GPU 825 may interface 821 with host bridge 810 (and interface 816 or 818 with system memory 820 through host bridge 810 or CPU 805 depending on the application or design). In still other embodiments, GPU 825 may interface 833 with IO bridge 815 (and interface 816 or 818 with system memory 820 through host bridge 810 or CPU 805 depending on the application or design). The functionality of GPU 825 may be integrated, in whole or in part, with CPU 805.

Host bridge 810 may be an interface device that interfaces between the one or more computational devices and IO bridge 815 and, in some embodiments, system memory 820. Host bridge 810 may include an interface 808 to CPU 805, an interface 813 to IO bridge 815, for embodiments where CPU 805 does not include an interface 818 to system memory 820, an interface 816 to system memory 820, and for embodiments where CPU 805 does not include an integrated GPU 825 or an interface 823 to GPU 825, an interface 821 to GPU 825. The functionality of host bridge 810 may be integrated, in whole or in part, with CPU 805. IO bridge 815 may be an interface device that interfaces between the one or more computational devices and various IO devices (e.g., 840, 845) and IO expansion, or add-on, devices (not independently illustrated). IO bridge 815 may include an interface 813 to host bridge 810, one or more interfaces 833 to one or more IO expansion devices 835, an interface 838 to keyboard 840, an interface 843 to mouse 845, an interface 848 to one or more local storage devices 850, and an interface 853 to one or more network interface devices 855. The functionality of IO bridge 815 may be integrated, in whole or in part, with CPU 805 and/or host bridge 810. Each local storage device 850, if any, may be a solid-state memory device, a solid-state memory device array, a hard disk drive, a hard disk drive array, or any other non-transitory computer readable medium. Network interface device 855 may provide one or more network interfaces including any network protocol suitable to facilitate networked communications.

Computing system 800 may include one or more network-attached storage devices 860 in addition to, or instead of, one or more local storage devices 850. Each network-attached storage device 860, if any, may be a solid-state memory device, a solid-state memory device array, a hard disk drive, a hard disk drive array, or any other non-transitory computer readable medium. Network-attached storage device 860 may or may not be collocated with computing system 800 and may be accessible to computing system 800 via one or more network interfaces provided by one or more network interface devices 855.

One of ordinary skill in the art will recognize that computing system 800 may be a conventional computing system or an application-specific computing system (not shown). In certain embodiments, an application-specific computing system (not shown) may include one or more ASICs (not shown) that perform one or more specialized functions in a more efficient manner. The one or more ASICs (not shown) may interface directly with CPU 805, host bridge 810, or GPU 825 or interface through IO bridge 815. Alternatively, in other embodiments, an application-specific computing system (not shown) may be reduced to only those components necessary to perform a desired function in an effort to reduce one or more of chip count, printed circuit board footprint, thermal design power, and power consumption. The one or more ASICs (not shown) may be used instead of one or more of CPU 805, host bridge 810, IO bridge 815, or GPU 825. In such systems, the one or more ASICs may incorporate sufficient functionality to perform certain network and computational functions in a minimal footprint with substantially fewer component devices.

As such, one of ordinary skill in the art will recognize that CPU 805, host bridge 810, IO bridge 815, GPU 825, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 800 is merely exemplary and not intended to limit the type, kind, or configuration of component devices that constitute a computing system 800 suitable for executing software methods in accordance with one or more embodiments of the present invention. Notwithstanding the above, one of ordinary skill in the art will recognize that computing system 800 may be a standalone, laptop, desktop, industrial, server, blade, or rack mountable system and may vary based on an application or design.

Advantages of one or more embodiments of the present invention may include one or more of the following:

In one or more embodiments of the present invention, a method and system for passive asset tracking using observations of Wi-Fi access points allows for passively tracking moveable assets by one or more potentially unrelated wireless devices that are in-range of assets broadcasting Wi-Fi signals even though the wireless device, or user thereof, may not even know they are participating in the asset tracking task. In this way, every smartphone in the vicinity of an asset that is desired to be tracked may, anonymously, and without awareness, participate in the asset tracking task.

In one or more embodiments of the present invention, a method and system for passive asset tracking using observations of Wi-Fi access points leverage already existing devices, systems, and networks to passively track the location of assets without requiring the asset itself to have any connectivity to the Internet or other network connection.

In one or more embodiments of the present invention, a method and system for passive asset tracking using observations of Wi-Fi access points uses one or more Wi-Fi access points, that do not require connectivity to any particular network, to identify one or more assets in the field using Wi-Fi wireless network discovery and Wi-Fi access point reporting features of modern smartphones and location services to passively identify the location of the one or more assets. The moveable assets may be passively tracked by one or more wireless devices that may be independent and unrelated whenever any one or more of the wireless devices merely come into range of an asset associated with a Wi-Fi access point broadcasting Wi-Fi signals, without any intent or awareness on the part of the wireless device, or user thereof, that they are participating in the asset tracking task due to the nature of the Wi-Fi wireless network discovery protocol.

In one or more embodiments of the present invention, a method and system for passive asset tracking using observations of Wi-Fi access points leverages existing infrastructure inherent in smartphones, operating systems, and software applications to report their location as well as the unique identifying information of Wi-Fi access points they encounter for improving the accuracy of location-based services for the asset tracking task without their awareness.

In one or more embodiments of the present invention, a method and system for passive asset tracking using observations of Wi-Fi access points uses the Wi-Fi wireless network discovery protocol as well as the Wi-Fi access point reporting feature of smartphones to passively track assets associated with Wi-Fi access points by one or more wireless devices without requiring that the wireless devices associate with any particular Wi-Fi access point, using publicly accessibly Wi-Fi signals, and in passive scanning applications, completely anonymously with respect to the asset tracking task.

In one or more embodiments of the present invention, a method and system for passive asset tracking using observations of Wi-Fi access points, a Wi-Fi access point associated with an asset does not require any connectivity to the Internet or any other network connection and does not require a GPS receiver, relying instead on the one or more wireless devices to report the time, date, and relative location of the in-range Wi-Fi access point associated with the asset.

In one or more embodiments of the present invention, a method and system for passive asset tracking using observations of Wi-Fi access points, an asset tracking database receives unique information identifying and information relating to the location of one or more Wi-Fi access points received directly or indirectly from one or more wireless devices or a Wi-Fi AP Database. The location of the asset may be tracked in the asset tracking database by the location of the Wi-Fi access point.

In one or more embodiments of the present invention, a method and system for passive asset tracking using observations of Wi-Fi access points may use a Wi-Fi access point that allows for the assignment of alternative meanings to various parts of the beacon frame or probe response corresponding to attributes of the Wi-Fi access point or asset physically and logically associated with it.

In one or more embodiments of the present invention, a method and system for passive asset tracking using observations of Wi-Fi access points reduces theft by providing a trackable asset without conventional asset tracking hardware or software systems. If the perpetrator of the theft moves a trackable asset within range of any one or more wireless devices, the discovery of the Wi-Fi access point will be reported, and the asset tracking database will be able to locate the associated asset without the perpetrator knowing that the asset has been tracked.

In one or more embodiments of the present invention, a method and system for passive asset tracking using observations of Wi-Fi access points substantially reduces the complexity and cost associated with deploying a comprehensive asset tracking system. As opposed to conventional asset tracking systems, one or more wireless devices, which may be completely independent of and unrelated to the asset tracking task, serve as the tracking infrastructure.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A method of passive asset tracking using observations of Wi-Fi access points comprising:
    associating, in an asset tracking database, unique identifying information of a Wi-Fi access point with a moveable asset to be tracked,
    wherein the Wi-Fi access point is disposed on, attached to, or integrated with the movable asset,
    wherein one or more wireless devices that encounter the Wi-Fi access point report observation data including the unique identifying information of the Wi-Fi access point and location information to a Wi-Fi AP Database, and
    wherein there is no communication between the asset tracking database and the one or more wireless devices that report encounters with the Wi-Fi access point to the Wi-Fi AP Database;
    receiving, at the asset tracking database, observation data from the Wi-Fi AP Database comprising the unique identifying information of the Wi-Fi access point and location information;
    determining, at the asset tracking database, a location of the moveable asset based, at least in part, on the observation data of the Wi-Fi access point received from the Wi-Fi AP Database; and
    providing a user of the asset tracking database the location of the moveable asset.

2. The method of claim 1, further comprising:
    storing the location of the moveable asset in the asset tracking database.

3. The method of claim 1, wherein the unique identifying information of the Wi-Fi access point comprises a BSSID of the Wi-Fi access point.

4. The method of claim 1, wherein the location information comprises a latitude and a longitude of the Wi-Fi access point.

5. The method of claim 1, wherein the location information comprises a latitude and a longitude of the reporting wireless device at or near the time of the encounter with the Wi-Fi access point.

6. The method of claim 1, wherein the location information comprises a received signal strength of the Wi-Fi access point measured by the reporting wireless device at or near the time of the encounter with the Wi-Fi access point.

7. The method of claim 1, wherein the location information comprises a latitude and a longitude of one or more other Wi-Fi access points near the Wi-Fi access point at or near the time of a reporting wireless device's encounter with the Wi-Fi access point.

8. The method of claim 1, wherein the location information comprises a received signal strength of one or more other Wi-Fi access points near the Wi-Fi access point at or near the time of a reporting wireless device's encounter with the Wi-Fi access point.

9. The method of claim 1, wherein determining the location of the moveable asset comprises using a latitude and longitude of the Wi-Fi access point as the location of the moveable asset.

10. The method of claim 1, wherein determining the location of the moveable asset comprises using a latitude and longitude of a reporting wireless device as the location of the moveable asset.

11. The method of claim 1, wherein determining the location of the moveable asset comprises using a received signal strength of the Wi-Fi access point measured by a reporting wireless device at or near the time of its encounter with the Wi-Fi access point to determine the location of the moveable asset.

12. The method of claim 1, wherein determining the location of the moveable asset comprises using a latitude and longitude of one or more other Wi-Fi access points encountered by a reporting wireless device at or near the time of its encounter with the Wi-Fi access point to determine the location of the moveable asset.

13. The method of claim 1, wherein determining the location of the moveable asset comprises using a received signal strength of one or more other Wi-Fi access points measured by a reporting wireless device at or near the time of its encounter with the Wi-Fi access point to determine the location of the moveable asset.

14. A method of passive asset tracking using observations of Wi-Fi access points comprising:
    associating, in an asset tracking database, unique identifying information of a Wi-Fi access point with a moveable asset to be tracked,
    wherein the Wi-Fi access point is disposed on, attached to, or integrated with the moveable asset,
    wherein one or more wireless devices that encounter the Wi-Fi access point report observation data including the unique identifying information of the Wi-Fi access point and second location information to a Wi-Fi AP Database,
    wherein there is no communication between the asset tracking database and the one or more wireless devices that report encounters with the Wi-Fi access point to the Wi-Fi AP Database;
    receiving, at the asset tracking database, first observation data from one or more direct reporting wireless devices that encounter the Wi-Fi access point comprising the unique identifying information of the Wi-Fi access point and first location information;
    receiving, at the asset tracking database, second observation data from the Wi-Fi AP Database comprising the unique identifying information of the Wi-Fi access point and second location information;
    determining, at the asset tracking database, a location of the moveable asset based, at least in part, on the first and/or the second observation data of the Wi-Fi access point; and
    providing a user of the asset tracking database the location of the moveable asset.

15. The method of claim 14, further comprising:
    storing the location of the moveable asset in the asset tracking database.

16. The method of claim 14, wherein the unique identifying information of the Wi-Fi access point comprises a BSSID of the Wi-Fi access point.

17. The method of claim 14, wherein the first and/or the second location information comprises a latitude and a longitude of the Wi-Fi access point.

18. The method of claim 14, wherein the first and/or the second location information comprises a latitude and a longitude of the reporting wireless device at or near the time of the encounter with the Wi-Fi access point.

19. The method of claim 14, wherein the first and/or the second location information comprises a received signal strength of the Wi-Fi access point measured by the reporting wireless device at or near the time of the encounter with the Wi-Fi access point.

20. The method of claim 14, wherein the first and/or the second location information comprises a latitude and a longitude of one or more other Wi-Fi access points near the Wi-Fi access point at or near the time of a reporting wireless device's encounter with the Wi-Fi access point.

21. The method of claim 14, wherein the first and/or the second location information comprises a received signal strength of one or more other Wi-Fi access points near the Wi-Fi access point at or near the time of a reporting wireless device's encounter with the Wi-Fi access point.

22. The method of claim 14, wherein determining the location of the moveable asset comprises using a latitude and longitude of the Wi-Fi access point as the location of the moveable asset.

23. The method of claim 14, wherein determining the location of the moveable asset comprises using a latitude and longitude of a reporting wireless device as the location of the moveable asset.

24. The method of claim 14, wherein determining the location of the moveable asset comprises using a received signal strength of the Wi-Fi access point measured by a reporting wireless device at or near the time of its encounter with the Wi-Fi access point to determine the location of the moveable asset.

25. The method of claim 14, wherein determining the location of the moveable asset comprises using a latitude and longitude of one or more other Wi-Fi access points encountered by a reporting wireless device at or near the time of its encounter with the Wi-Fi access point to determine the location of the moveable asset.

26. The method of claim 14, wherein determining the location of the moveable asset comprises using a received signal strength of one or more other Wi-Fi access points measured by a reporting wireless device at or near the time of its encounter with the Wi-Fi access point to determine the location of the moveable asset.

* * * * *